US010984467B2

(12) United States Patent
Ayush et al.

(10) Patent No.: US 10,984,467 B2
(45) Date of Patent: Apr. 20, 2021

(54) COMPATIBILITY-BASED IDENTIFICATION OF INCOMPATIBLE OBJECTS IN DIGITAL REPRESENTATIONS OF REAL-WORLD ENVIRONMENTS

(71) Applicant: Adobe Inc., San Jose, CA (US)

(72) Inventors: Kumar Ayush, Uttar Pradesh (IN); Harnish Lakhani, Maharashtra (IN); Atishay Jain, New Delhi (IN)

(73) Assignee: Adobe Inc., San Jose, CA (US)

( * ) Notice: Subject to any disclaimer, the term of this patent is extended or adjusted under 35 U.S.C. 154(b) by 44 days.

(21) Appl. No.: 16/281,806

(22) Filed: Feb. 21, 2019

(65) Prior Publication Data

US 2020/0273090 A1    Aug. 27, 2020

(51) Int. Cl.
| | |
|---|---|
| *G06Q 30/00* | (2012.01) |
| *G06Q 30/06* | (2012.01) |
| *G06T 7/73* | (2017.01) |
| *G06T 7/60* | (2017.01) |
| *G06K 9/32* | (2006.01) |
| *G06T 19/20* | (2011.01) |
| *G06T 7/90* | (2017.01) |

(52) U.S. Cl.
CPC ....... *G06Q 30/0643* (2013.01); *G06K 9/3241* (2013.01); *G06Q 30/0603* (2013.01); *G06Q 30/0631* (2013.01); *G06T 7/60* (2013.01); *G06T 7/75* (2017.01); *G06T 7/90* (2017.01); *G06T 19/20* (2013.01)

(58) Field of Classification Search
None
See application file for complete search history.

(56) References Cited

U.S. PATENT DOCUMENTS 10,475,103 B2 * 11/2019 Hiranandani ........ G06K 9/6202

OTHER PUBLICATIONS

Ren, S., He, K, Girshick, R., & Sun, J. (2015). Faster r-cnn: Towards real-time object detection with region proposal networks. In Advances in neural information processing systems (pp. 91-99).

(Continued)

*Primary Examiner* — Mila Airapetian
(74) *Attorney, Agent, or Firm* — Shook, Hardy & Bacon, L.L.P.

(57) ABSTRACT

The technology described herein is directed to object compatibility-based identification and replacement of objects in digital representations of real-world environments for contextualized content delivery. In some implementations, an object compatibility and retargeting service that selects and analyzes a viewpoint (received from a user's client device) to identify objects that are the least compatible with other surrounding real-world objects in terms of style compatibility with the surrounding real-world objects and color compatibility with the background is described. The object compatibility and retargeting service also generates recommendations for replacing the least compatible object with objects/products having more style/design compatibility with the surrounding real-world objects and color compatibility with the background. Furthermore, the object compatibility and retargeting service can create personalized catalogues with the recommended objects/products embedded in the viewpoint in place of the least compatible object with similar pose and scale for retargeting the user.

20 Claims, 14 Drawing Sheets

(56) References Cited

OTHER PUBLICATIONS

Girshick, R., Donahue, J., Darrell, T., & Malik, J. (2014). Rich feature hierarchies for accurate object detection and semantic segmentation. In Proceedings of the IEEE conference on computer vision and pattern recognition (pp. 580-587).
Aubry, M., Maturana, D., Efros, A. A., Russell, B. C., & Sivic, J. (2014). Seeing 3d chairs: exemplar part-based 2d-3d alignment using a large dataset of cad models. In Proceedings of the IEEE conference on computer vision and pattern recognition (pp. 3762-3769).
Liu, T., Hertzmann, A., Li, W., & Funkhouser, T. (2015). Style compatibility for 3D furniture models. ACM Transactions on Graphics (TOG), 34(4), 1-9.
Kulis, B. (2012). Metric learning: A survey. Foundations and trends in machine learning, 5(4), 287-364.
O'Donovan, P., Agarwala, A., & Hertzmann, A. (2011). Color compatibility from large datasets. In ACM SIGGRAPH 2011 papers (pp. 1-12).
Jones, D. R., Perttunen, C. D., & Stuckman, B. E (1993). Lipschitzian optimization without the Lipschitz constant. Journal of optimization Theory and Applications, 79(1), 157-181.
Joachims, T. (Jul. 2002). Optimizing search engines using clickthrough data. In Proceedings of the eighth ACM SIGKDD international conference on Knowledge discovery and data mining (pp. 133-142).
Stone, M. (2006). Choosing colors for data visualization. Business Intelligence Network, 2.

\* cited by examiner

COMPATIBILITY-BASED IDENTIFICATION OF INCOMPATIBLE OBJECTS IN DIGITAL REPRESENTATIONS OF REAL-WORLD ENVIRONMENTS

TECHNICAL FIELD

Aspects of the disclose are related to the field of machine learning and artificial intelligence, and in particular, to utilizing machine learning and artificial neural networks to identify and replace the least compatible objects in digital representations of real-word environments.

BACKGROUND

Digital content providers, digital publishers, and digital marketers increasingly seek techniques for creating targeted content that personalizes communications to users based on information that is available about the users. Such targeted content comes in various forms. For example, some digital publishers and marketers create targeted content by inserting a user's name (extracted from a user profile) into an email, pop-up advertisement, or other digital message. Other digital marketers create targeted content by, for example, adjusting content of a message based on a device's location data, such as information extracted from a web browser or an IP address connected to the user's device. Still other digital marketers attempt to contextualize content by identifying adjectives or adverbs from social media posts and inserting the identified adjectives or adverbs into advertisements.

In addition to extracting information from a device or from software running on the device, digital publishers and marketers commonly create targeted content based on a user's web-browsing data. For example, conventional techniques of contextualized content delivery include selecting content based on a user's web-browsing history (e.g., URL addresses visited by a user) or prior e-commerce transactions (e.g., products purchased through a website or mobile application). Other conventional techniques of contextualized content delivery include generating a product recommendation based on metadata associated with the product.

While these conventional techniques may enable marketers to provide relevant information, the conventional techniques have various drawbacks. For example, users are often wary of providing information on the Internet and commonly provide intentionally false information. Moreover, conventional techniques based on metadata rely on administrators or others to properly tag or otherwise associate products with metadata, which can be time consuming, expensive, and inaccurate. Regardless, the metadata-based recommendations are usually founded on similarity of meta-tags among products like categories or purchase data from other users, which can, and often does, result in inaccurate, ineffective product recommendations that users frequently ignore.

SUMMARY

One or more embodiments described herein, among other benefits, solve one or more of the foregoing or other problems in the art by providing systems, methods, and non-transitory computer readable media that accurately identify and replace the least compatible objects in two-dimensional digital representations of real-world environments. In particular, the technology described herein analyzes a viewpoint depicting a two-dimensional digital representation of a real-world environment to detect real-world objects within the viewpoint using one or more neural networks. Three-dimensional (3D) models for the identified real-world objects along with pose and scale are then identified using a part-based alignment algorithm. The least compatible object in the viewpoint is then identified based on a weighted combination of a style incompatibility of the object in relation to other of the identified real-world objects in the viewpoint and a color incompatibility of the object in relation to a background of the viewpoint.

At least one product recommendation is generated based on a weighted combination of a style compatibility of the product in relation to the real-world objects in the viewpoint and a color compatibility of the product in relation to the background of the viewpoint. A modified viewpoint is generated by embedding a two-dimensional representation of the product recommendation at the location of the removed least compatible object with matching pose and scale. A targeted communication including the modified viewpoint can then be generated and provided to a user via one or more marketing channels.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

Figure 1A:
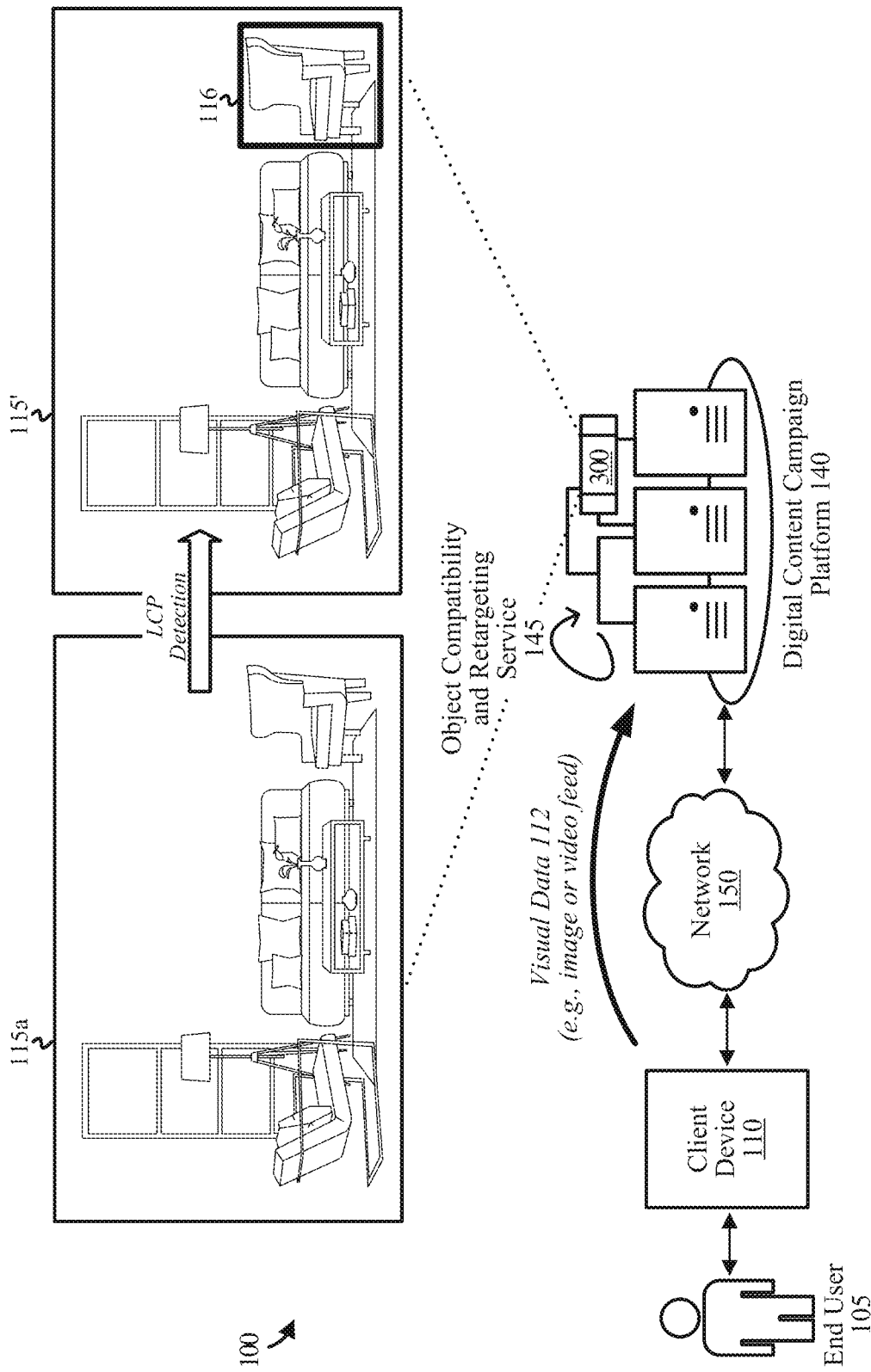
FIGS. 1A and 1B depict block diagrams illustrating an example operational environment including a digital content campaign platform operable to execute an object compatibility and retargeting service, according to some implementations.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include machine-implemented methods, computing devices, or computer readable medium.

The technology described herein is directed to an object compatibility and retargeting service that selects and analyzes a viewpoint (received from a user's client device) to identify objects that are the least compatible with other surrounding real-world objects in terms of style compatibility with the surrounding real-world objects and color compatibility with the background. The object compatibility and retargeting service also generates recommendations for replacing the least compatible object with objects/products having more style/design compatibility with the other surrounding real-world objects and color compatibility with the background. Furthermore, the object compatibility and retargeting service can create personalized catalogues with the recommended objects/products embedded in the viewpoint in place of the least compatible object with similar pose and scale for retargeting users more effectively.

Because the viewpoint holds information previously unavailable through web-based browsing of products, at least one technical effect enabled by the techniques discussed herein is the ability to automatically create contextually relevant targeted communications including modified viewpoints embedded with relevant product recommendations that are more effective at soliciting user conversions. Unlike conventional techniques, the contextually relevant targeted communications can be automatically created without soliciting additional information from a customer or relying on inaccurate metadata. As used herein, the term 'automatically' refers to performance by a computer or machine without human intervention.

Although primarily discussed with reference to creating contextually relevant targeted communications, the compatibility-based identification technology discussed herein can be applied to a variety of image processing tasks. For example, the compatibility-based identification technology can be used on any digital representation of a real-world environments to identify incompatible objects therein.

Figure 1B:
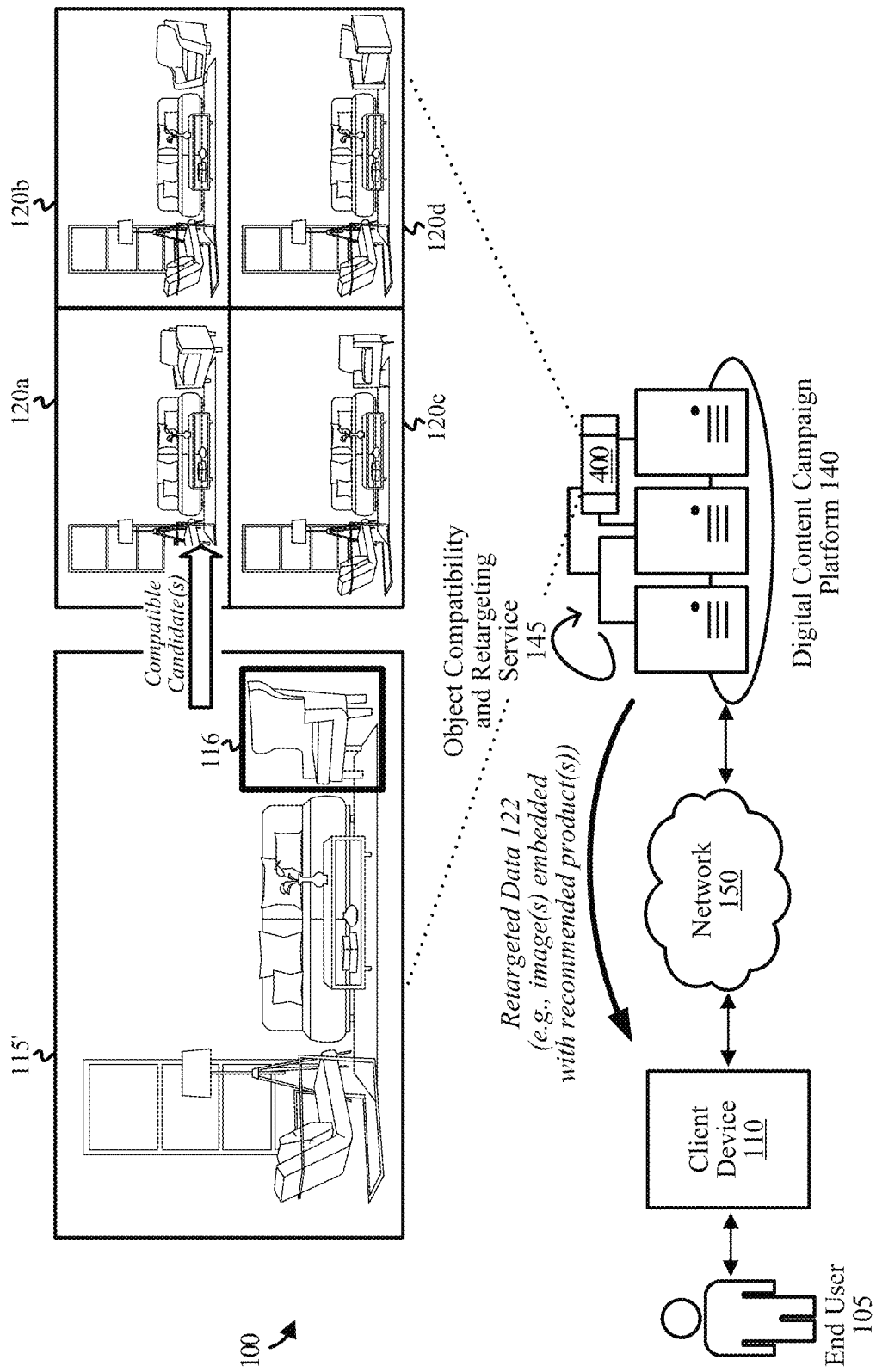

FIGS. 1A and 1B depict block diagrams illustrating an example operational environment 100 including digital content campaign platform 140 operable to execute an object compatibility and retargeting service 145, according to some implementations. An overview of the digital content campaign platform 140 and operation of the object compatibility and retargeting service 145 is described in relation to FIGS. 1A and 1B. Thereafter, a more detailed description of the components and processes of the object compatibility and retargeting service 145 are provided in relation to the subsequent figures.

The example operational environment 100 includes an end user 105, a client device 110, the digital content campaign platform 140, and network 150. The components of the environment can communicate via the network 150. The network 150 may be any suitable network over which computing devices can communicate. Example networks are discussed in greater detail with reference to FIG. 12. Additional or fewer systems or components are possible.

Figure 12:
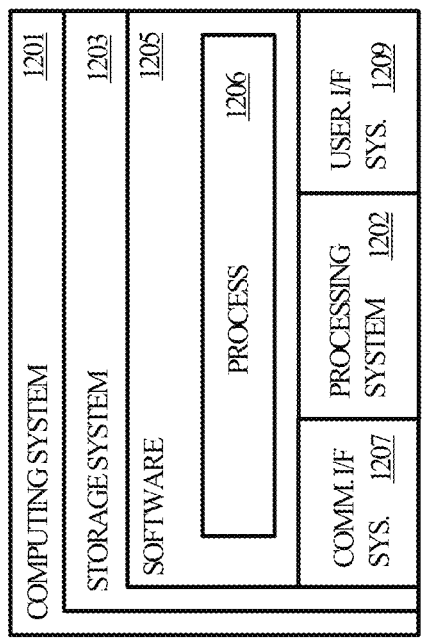
FIG. 12 depicts a block diagram illustrating an example computing system suitable for implementing the technology disclosed herein, including any of the applications, architectures, elements, processes, and operational scenarios and sequences illustrated in the Figures and discussed below in the Technical Disclosure.

As discussed herein, the operational environment 100 includes client device 110 associated with end user 105. The client device 110 can be one of a variety of computing devices, including a smartphone, desktop computer, laptop computer, Augmented Reality (AR) device, or other computing device including combinations or variations thereof of which computing system 1201 of FIG. 12 is representative. Furthermore, although FIGS. 1A and 1B depict a single client device 110, in some implementations the operational environment 100 can include multiple different end users, each associated with one or more different client devices.

The digital content campaign platform 140 is representative of any system or collection of systems that is configured to facilitate employment of an object compatibility and retargeting service 145 for identifying objects that are the least compatible with other surrounding real-world objects in a viewpoint in terms of style compatibility with the surrounding real-world objects and color compatibility with the background. The object compatibility and retargeting service 145 can also generate recommendations for replacing the least compatible object with objects/products having more style/design compatibility with the other surrounding real-world objects and color compatibility with the background of the viewpoint. Furthermore, the object compatibility and retargeting service 145 can also retarget the user by creating personalized catalogues embedded with recommended objects/products in the viewpoint at the location of the least compatible object with similar pose and scale.

The digital content campaign platform 140 may include server computers, blade servers, rack servers, and any other type of computing system (or collection thereof) suitable for employing the object compatibility and retargeting service 145 and/or otherwise carrying out the operations discussed herein. Such systems may employ one or more virtual machines, containers, or any other type of virtual computing resource in the context of identifying and replacing a least compatible object in a viewpoint with at least one more compatible object/product of which computing system 1201 of FIG. 12 is representative.

The digital content campaign platform 140 may generate, store, receive, and transmit electronic data, such as AR content, digital video, digital images, metadata, etc. For example, the digital content campaign platform 140 may receive data from the client device 110 in the form of a camera feed (digital images or video). In addition, the digital content campaign platform 140 can transmit data to the client device 110 to retarget the user of the client device 110. For example, the digital content campaign platform 140 employing the object compatibility and retargeting service 145 can identify and replace a least compatible object in user viewpoint with products/objects that are more compatible for retargeting potential customers.

The digital content campaign platform 140 communicates with the user client device 110 to transmit and/or receive data via the network 150. In some implementations, the digital content campaign platform 140 includes one or more of a content server, an application server, a communication server, a web-hosting server, a social networking server, and a digital content campaign server.

As shown in the example of FIGS. 1A and 1B, the digital content campaign platform 140 employs the object compatibility and retargeting service 145 to execute at least one of a least compatible object detection process 300 (FIG. 1A) and a compatible product identification and retargeting process 400 (FIG. 1B).

Referring first to FIG. 1A, initially, the digital content campaign platform 140 receives visual data 112 from client device 110 over network 150. As discussed herein, the visual data 112 can include one or more digital images, video, or visual representations that depict at least one scene or image from a real-world environment including multiple real-world objects. In some implementations, the visual data 112 can include a digital representation of an AR environment provided by an AR application executing on client device 110. Alternatively, or additionally, digital video or one or more images may be uploaded to the digital content campaign platform 140 from client device 110.

The object compatibility and retargeting service 145 receives and analyzes the visual data 112 to select a viewpoint 115 from which to identify and judge compatibility of the objects contained therein for replacement of a least compatible object 116 with at least one object/product that is more compatible. For example, the digital content campaign platform 140 may receive visual data 112 from client device 110 based on usage of an AR application (not shown) executing thereon.

Once received, the object compatibility and retargeting service 145 processes the visual data 112 to select (or capture) a viewpoint. For example, if the visual data 112 is an AR session (or stream), the object compatibility and retargeting service 145 selects a relevant camera frame or screenshot from the AR session as the viewpoint. In some implementations, the object compatibility and retargeting service 145 may select the first time instant in the AR session when the user spends more time than a fixed threshold without changing the object's orientation (captured by a binary variable in the existing system) and without moving device (captured by accelerometer data of the device). Other probabilistic models can also be used to select viewpoint 115.

To identify the least compatible object in viewpoint 115, the object compatibility and retargeting service 145 first analyzes the viewpoint to identify real-world objects (e.g., furniture objects) contained therein. In some implementations, the object compatibility and retargeting service 145 utilizes one or neural networks to identify the relevant real-world objects. For example, the object compatibility and retargeting service 145 may utilize a Region-based Convolutional Neural Network (R-CNN) to generate object proposals in the form of regions within the viewpoint 115 that satisfy a probability threshold of containing a real-world object. Specifically, the object compatibility and retargeting service 145 can implement a region proposal network ("RPN") to generate probabilities of containing real-world objects for various regions within the viewpoint 115. The object compatibility and retargeting service 145 then selects one or more regions with probabilities above a threshold as regions likely containing real-world objects.

Once the one or more objects are identified, the object compatibility and retargeting service 145 utilizes a 2D-3D alignment algorithm to search a model data store for a 3D model that matches each of the identified real-world objects in the viewpoint. Specifically, the object compatibility and retargeting service 145 searches a model data store to identify a 3D model that matches a two-dimensional representation of each real-world object identified within the viewpoint. Example operation of the 2D-3D alignment algorithm is discussed in greater detail with reference to at least FIGS. 5A and 5B.

The object compatibility and retargeting service 145 then computes an incompatibility energy (or score) for each of the detected real-world objects in the viewpoint 115 using the previously identified 3D models corresponding to the real-world objects in the viewpoint. Specifically, for each of the identified real-world objects in the viewpoint 115, the object compatibility and retargeting service 145 utilizes the identified 3D model to compute a style incompatibility with the other of the identified real-world objects (the surrounding real-world objects) in the viewpoint 115 and a color incompatibility with the background of the viewpoint 115. The computed style incompatibility and color incompatibility are then normalized and an overall incompatibility energy determined for each of the detected real-world objects using a weighted combination of the computed style and color incompatibility energies (or scores).

Based on the overall incompatibility energies determined for each of the detected two-dimensional objects, the object compatibility and retargeting service 145 selects the real-word object in the viewpoint with the highest overall incompatibility energy as the least compatible object in the viewpoint 115. As shown in the example of FIG. 1A, the least compatible real-word object (e.g., furniture object) detected in viewpoint 115' (viewpoint 115 after executing the least compatible object detection process 300) is object ("chair") 116.

Referring next to FIG. 1B, the object compatibility and retargeting service 145 identifies one or more product recommendations that are more stylistically compatible for replacing the least compatible object 116. Specifically, a style compatibility energy is computed for candidate products of a same class as the identified least compatible object 116 using a corresponding 3D model of the product.

In some implementations, the object compatibility and retargeting service 145 implements a style compatibility algorithm to analyze geometric features of the 3D models and compare the geometric features of 3D models corresponding to the real-world objects (other than the least compatible object) with geometric features of the multiple products stored within a product data store. Accordingly, the object compatibility and retargeting service 145 identifies one or more candidate products that satisfy a compatibility threshold in relation to the corresponding 3D models of remaining real-world objects.

The object compatibility and retargeting service 145 selects one or more of the candidate products with the highest compatibility energies (product recommendations) and embeds a two-dimensional representation of the product recommendation(s) in place of the least compatible object, which is removed from the viewpoint 115. More specifically, the digital content campaign platform 145 removes the least compatible object from the viewpoint using bounding region information obtained during object detection, replicates the viewpoint for each product recommendation and embeds a two-dimensional representation of one of the product recommendations in each of replicated viewpoints with the same pose and scale as the removed least compatible object.

The object compatibility and retargeting service 145 then processes the replicated viewpoints to determine a color compatibility for each embedded candidate product with the background of the viewpoint. The computed style and color compatibilities for each candidate product are then normalized and an overall compatibility energy (or retargeting score) determined for the candidate products using a weighted combination of the computed style and color compatibilities. The object compatibility and retargeting service 145 then ranks the candidate products in decreasing order of overall retargeting score and selects one or more product recommendations from the top ranked candidate products to include in a final retargeting list.

In some implementations, a two-dimensional representation of the each of the product recommendations in the final retargeting list are provided back to the end user 105 in one or more augmented (or retargeted) viewpoints 120a-120d. More specifically, the two-dimensional representations of the product recommendations in the final retargeting list are embedded in the augmented viewpoints 120a-120d with the same (or similar) pose and scale as the removed least compatible object 116 and provided back to the end user 105 within retargeted data 122. In some implementations, the augmented viewpoints 120a-120d can be included in a personalized catalogue and directed to the user via various marketing channels such as, for example, email, push notification, personalize snail mail catalogue, etc., including combinations or variations thereof.

Figure 2:
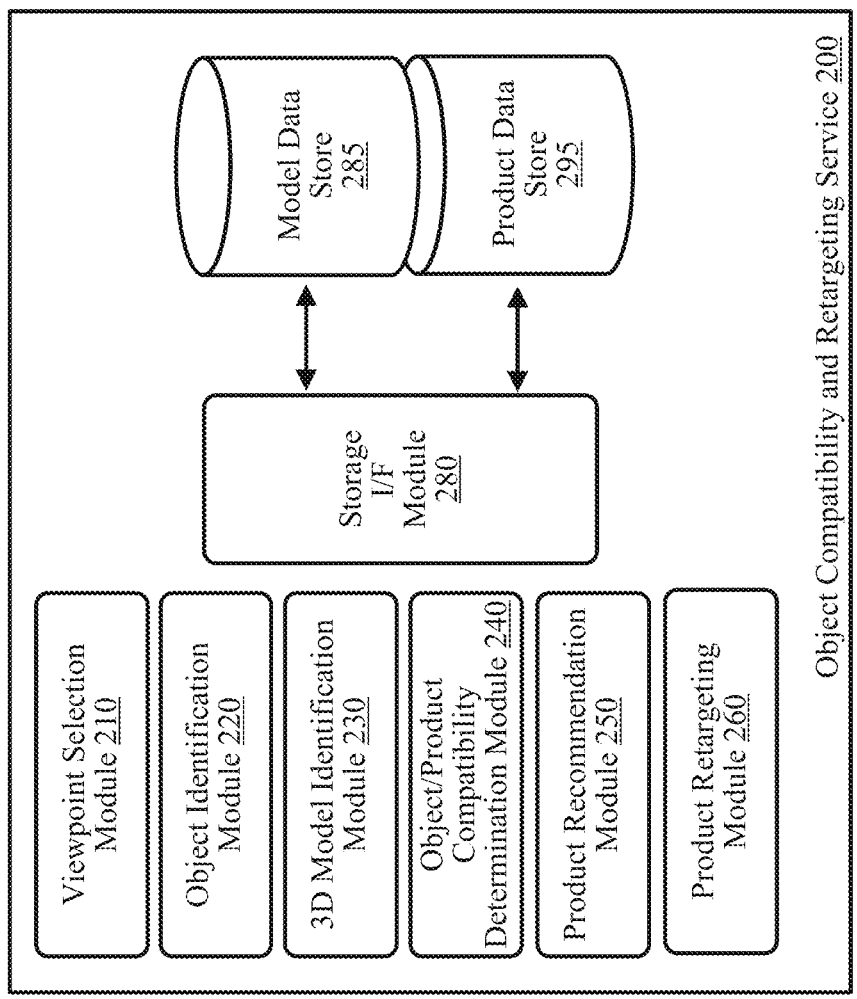
FIG. 2 depicts example components of an object compatibility and retargeting service, according to some implementations.

FIG. 2 depicts example components of an object compatibility and retargeting service 200, according to some implementations. The object compatibility and retargeting service 200 can be object compatibility and retargeting service 145 of FIGS. 1A and 1B, although alternative configurations are possible. As discussed herein, the components of the object compatibility and retargeting service 200 can be employed on a digital content campaign platform such as, for example, digital content campaign platform 140 of FIGS. 1A and 1B. The functions represented by the components, modules and/or engines described herein can be implemented individually or in any combination thereof, partially or wholly, in hardware, software, or a combination of hardware and software. Additionally, in some implementations, the components, modules and/or engines of the object compatibility and retargeting service 200 can be distributed across multiple systems or platforms including, but not limited to, across the client device 110 and digital content campaign platform 140 of FIGS. 1A and 1B.

As illustrated in the example of FIG. 2, the object compatibility and retargeting service 200 includes a viewpoint selection module 210, an object identification module 220, a 3D model identification module 230, an object/product compatibility model 240, a product recommendation module 250, a product retargeting module 260, a storage interface (I/F) module 280, a model data store 285, and a product data store 295. Other or fewer components are also possible.

The viewpoint selection module 210 is configured to process and/or otherwise analyze visual data (e.g., visual data 112 of FIG. 1) provided by the client device to identify and/or otherwise select a viewpoint (e.g., viewpoint 115 of FIG. 1) from which the object compatibility and retargeting service 200 determines compatibility of the objects contained therein for replacement of the least compatible object with a more compatible object/product. As discussed herein, the visual data can include one or more digital images, video, or visual representations that depict at least one scene or image from a real-world environment including multiple real-world objects.

In some implementations, the visual data 112 can include a digital representation of an AR environment provided by an AR application executing on a client device. In such instances, the viewpoint selection module 210 may receive AR session data (or an AR feed) initiated by the user's AR application. The viewpoint selection module 210 is then operable to select (or capture) the viewpoint from user's AR session. For example, the viewpoint selection module 210 may capture a viewpoint representative of a real-world environment from the AR session data while a user selects and overlays one or more ancillary augmented products on the viewpoint within the AR session. An example illustrating capturing a viewpoint during the augmentation process is shown and discussed in greater detail with reference to FIG. 7.

In some implementations, viewpoint selection module 210 can access motion or movement-related information provided by a client device (e.g., the client device 110 of FIG. 1) to detect motion or movement of the client device. For example, the viewpoint selection module 210 can access an IMU, accelerometer, and/or gyroscope of the client device to determine the motion or movement-related information. Accordingly, the viewpoint selection module 210 can determine when the location of the client device is static (or relatively static) and capture a frame of a camera feed received from the client device at a time instant when the client device satisfies a stillness (and/or movement) threshold. In some implementations, to satisfy the stillness threshold, the viewpoint selection module 210 determines that the user client device 108 is moving at a slow enough rate that a clear and stable image of a camera feed can be captured.

Alternatively, or additionally, the viewpoint selection module 210 can select or identify a viewpoint by capturing a frame of a camera feed at a time instant during a user's application session (e.g., while the user is using an AR client application) when the user spends more time than a time threshold without moving the client device (or without moving it more than a predetermined tolerance). The viewpoint selection module 210 can further select or identify a viewpoint based on user interactions with an AR product that the user has selected to overlay on the view of the real-world environment of a camera feed. For example, a user may be interacting with an AR product such as a wall painting and the viewpoint can be captured. To further illustrate, in addition or alternatively to determining a time instant where the user client device is sufficiently still, the viewpoint selection module 210 can also capture a frame of the camera feed at a time instant when the user has refrained from adjusting a location and/or orientation of an AR product within an AR client application for at least a threshold time period.

In some implementations, the viewpoint selection module 210 can determine a viewpoint based on user input. For example, the viewpoint selection module 210 can receive a user interaction with an element of an AR client application (e.g., a camera capture button) to capture a frame to use as a viewpoint to analyze for generating recommended products. In these implementations the viewpoint selection module 210 can determine a viewpoint when the user aims the user client device at a particular scene and elects to capture a frame of a real-world environment where the user would like to, for example, visualize and interact with AR product overlays. In still other implementations, the viewpoint selection module 210 can implement one or more probabilistic models (e.g., machine learning models) that select a viewpoint from a camera feed based on training the model to identify a camera frame with a high probability of depicting a desirable view of a real-world environment.

The object identification module 220 is configured to identify relevant real-world objects (e.g., furniture objects) in the viewpoint utilizing one or more neural networks. For example, the object identification module 220 may utilize a R-CNN to generate object proposals in the form of regions within the viewpoint that satisfy a probability threshold of containing a real-world object. Specifically, the object identification module 220 can implement a region proposal network ("RPN") to generate probabilities for various regions within the viewpoint of containing real-world objects and select one or more regions with probabilities above a threshold as regions likely containing objects.

Figure 8:
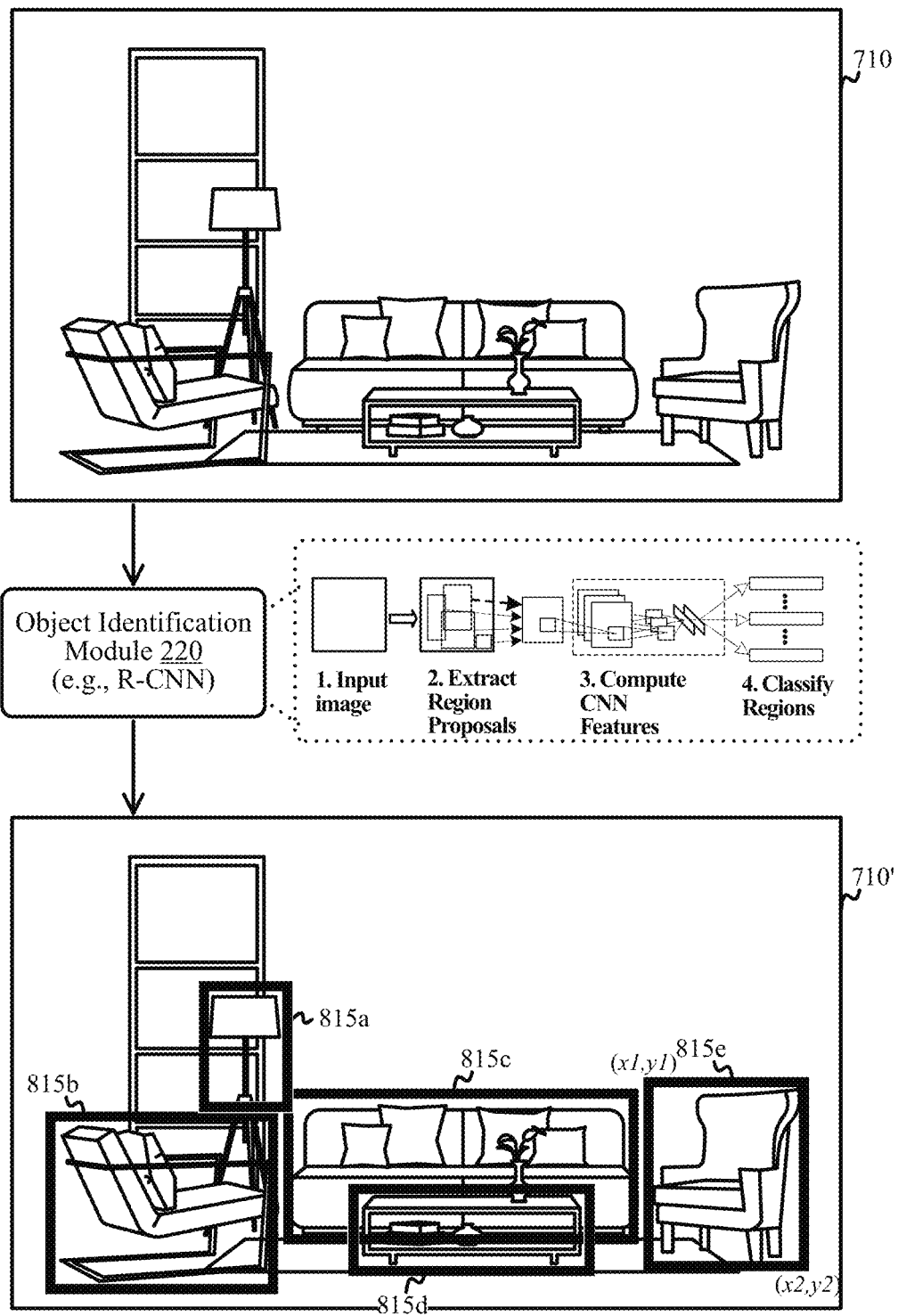
FIG. 8 depicts example operations of an object compatibility and retargeting service for identifying objects in a viewpoint, according to some implementations.

To further illustrate operation of the object identification module 220, the object identification module 220 takes a viewpoint as an input image for the R-CNN and generates object proposals (such as bounding boxes around identified objects 815a-815e of FIG. 8) with corresponding confidence scores and object labels. To generate proposal regions of a captured viewpoint, the object identification module 220 implements a region proposal algorithm as part of the object detection network to hypothesize object locations within the viewpoint. In particular, the object identification module 220 utilizes a region proposal network that shares full-image convolutional features with the object detection network (e.g., the R-CNN), thus enabling nearly cost-free region proposals. Among other benefits, by utilizing a region proposal network that shares features with the object detection network, the viewpoint selection module 210 can improve computational efficiency over many conventional systems that require larger amounts of computer storage and processing power to manage networks that do not share such interoperability due to their independent generation of feature vectors.

In some implementations, the object identification module 220 merges the region proposal network with a Fast R-CNN into a single unified network (e.g., by sharing the convolutional features). Thus, by using attention mechanisms, the region proposal network can inform the unified network where to look within the viewpoint to detect objects.

As noted above, the object identification module 220 utilizes the fully-convolutional RPN that simultaneously predicts object bounds and object quality region proposals. The object identification module 220 further utilizes the predicted object bounds and object quality region proposals as input for the Fast R-CNN to detect the objects within the viewpoint. For example, the object identification module 220 can generate a bounding box represented by two coordinate pairs, one for the top-left corner (x1, y1) and another for the bottom-right corner (x2, y2). Thus, for each bounding box corresponding to a different object identified within the viewpoint, the AR product recommendation system 102 can represent the set of all bounding boxes as:

$$B=\{b_1, b_2, \ldots, b_n\}$$

where B is the set of all bounding boxes, n is the total number of bounding boxes in the set, and each bounding box $b_i$ has a corresponding object label $l_i$ and confidence score $c_i$. An object label describes the type of object identified within the viewpoint (e.g., chair, sofa, handbag, skirt, etc.), and a confidence score describes a probability that a corresponding bounding box contains a real-world object with the given object label.

As mentioned, the object identification module 220 utilizes a region proposal network together with a Fast R-CNN. To elaborate on the Fast R-CNN, the object identification module 220 utilizes a Fast R-CNN that consists of three separate models. The first generates category-independent region proposals of the viewpoint. The second is a large CNN that extracts a fixed-length feature vector from each proposed region. The third is a set of class-specific linear support vector machines ("SVMs"). To implement the Fast R-CNN, the object identification module 220 can utilize the networks and techniques described in Ross Girshick, Jeff Donahue, Trevor Darrell, Jitendra Malik, *Rich Feature Hierarchies for Accurate Object Detection and Semantic Segmentation*, UC Berkeley (2014), which is incorporated herein by reference in its entirety.

To elaborate on how the object identification module 220 detects an object, the object identification module 220 utilizes the Fast R-CNN to generate a convolutional feature map of the viewpoint. On top of the convolutional features of the feature map, the object identification module 220 utilizes the region proposal network which consists of two additional convolutional layers: one that encodes each convolutional map position into a short feature vector, and another one that, at each convolutional map position, outputs an objectness score and regressed bounds for k region proposals relative to various scales and aspect ratios for the given location.

To generate region proposals using a region proposal network, the object identification module 220 slides a small network over the convolutional feature map output by the previous shared convolutional layer. The small network is fully connected to an n×n spatial window of the input convolutional feature map. The object identification module 220 maps each sliding window to a lower-dimensional vector and feeds the lower-dimensional vector into two sibling fully-connected layers—a box regression layer and a box classification layer. At each sliding window location, the object identification module 220 simultaneously predicts k region proposals and parameterizes the k proposals relative to k reference boxes. The object identification module 220 centers each reference box at a respective sliding window and associates the reference box with a corresponding scale and aspect ratio. In this way, the object identification module 220 takes the viewpoint and outputs the bounding boxes which indicate locations of real-world objects.

In some implementations, the object identification module 220 trains the R-CNN and the region proposal network to share convolutional features by implementing an alternating optimization technique. Indeed, the object identification module 220 can train the R-CNN and the region proposal network by implementing a training scheme that alternates between fine-tuning for the region proposal task and then fine-tuning for object detection, while keeping the proposals fixed. By utilizing this scheme, the object identification module 220 converges quickly and produces a unified network with convolutional features that are shared between both tasks.

In addition, the object identification module 220 can apply a loss function as part of the training process to reduce a measure of loss or error for the region proposal network. Thus, by reducing the loss, the object identification module 220 tunes the region proposal network to more accurately identify regions of the viewpoint likely to contain objects. For example, the object identification module 220 can implement the loss function described in Shaoqing Ren, Kaiming He, Ross Girshick, Jian Sun, *Faster R-CNN: Towards Real-Time Object Detection with Region Proposal Networks*, Advances in Neural Information Processing Systems (NIPS) (2015), which is incorporated herein by reference in its entirety.

The 3D model identification module 230 is configured to find a matching 3D model for each detected two-dimensional real-world object in a captured viewpoint along with pose and scale. As discussed herein, to find the matching 3D models, the 3D model identification module 230 utilizes a 2D-3D alignment algorithm to search a model data store 285.

Using a "chair" as an example, the 2D-3D alignment algorithm can model chairs of different styles as well as a large variation in pose by establishing part-based correspondences between 3D models (e.g., CAD) and a two-dimensional representation of the viewpoint. In some implementations, the 2D-3D alignment is achieved by: (i) representing each 3D model using a set of view-dependent mid-level visual elements learned from synthesized views in a discriminative fashion; (ii) calibrating the individual element detectors on a common dataset of negative images, and (iii) matching visual elements to the test image allowing for small mutual deformations while preserving the viewpoint and style constraints.

In some implementations, the style and pose detection is accomplished by finding an alignment between the two-dimensional chair and the most similar 3D model of a chair rendered with the most appropriate pose. In some implementations, the 3D model identification module 230 addresses this by representing the collection of all 3D models by calibrated view-dependent mid-level visual elements learned in a discriminative fashion from rendered views. At test time, the learned visual elements are applied to the test image in parallel. The most spatially and appearance-wise consistent alignment is found, while preserving the style and pose-consistency constraints. Example operations of the 2D-3D alignment algorithm are discussed in greater detail with reference to FIGS. 5A and 5B.

The object/product compatibility module 240 is configured to compute compatibility (and/or incompatibility) energies (or scores) for objects/products. For example, as part of the least compatible object detection process 300, which is discussed in greater detail with reference to FIG. 3, the object/product compatibility module 240 computes an incompatibility energy for each of the detected two-dimensional objects in a selected viewpoint. Specifically, for each of the identified objects, the object/product compatibility module 240 utilizes the identified 3D model to compute a style incompatibility energy with the other identified surrounding real-world objects and a color compatibility with the background. The computed style incompatibility and color incompatibility energies are then normalized and an overall incompatibility energy is determined for each of the detected two-dimensional real-world objects using a weighted combination of the computed style and color incompatibility energies. The object/product compatibility module 240 then identifies the least compatible object in the viewpoint as the detected real-word object in the viewpoint having the highest overall incompatibility energy.

Similarly, as part of the compatible product identification and retargeting process 400, which is discussed in greater detail with reference to FIG. 4, the object/product compatibility module 240 computes a compatibility energy for each candidate product in the product data store 295 using a corresponding 3D model of the product stored in the 3D model data store 285. As discussed herein, the object compatibility and retargeting service 200 includes a 3D model for each product in the product data store 295. In some implementations, the candidate products are products in the product data store 295 of a same class as the least compatible object in the viewpoint. However, in other implementations, candidate products can include all products in the data store or products from various different classes or types. Once the candidate products are identified, for each candidate product, the object/product compatibility module 240 is configured to compute a style compatibility of the product with the other detected real-world objects in the viewpoint, remove the least compatible object, embed a two-dimensional representation of a candidate product in the viewpoint, and compute a color compatibility with the background. The computed style compatibility and color compatibility are normalized, and an overall compatibility energy determined for each candidate product using a weighted combination of the normalized energies.

The product recommendation module 250 is configured to select product recommendations from the candidate products based on the overall retargeting score. In some implementations, the product recommendation module 250 ranks the candidate product recommendations in decreasing order of overall retargeting score and selects a predetermined number of the top-ranked candidate products for inclusion in a final retargeting list of product recommendations.

The product retargeting module 260 is configured to retarget the user (e.g., end user 105 of FIG. 1) with the product recommendations in place of the least compatible object in viewpoint. For example, the product retargeting module 260 can create an augmented (or retargeted) viewpoint with a two-dimensional representation of each of the product recommendations embedded therein with the same pose (orientation) and scale as the removed least compatible object. In some implementations, the augmented (or retargeted) viewpoints are included in a personalized catalogue and directed to the user via one or more available various marketing channels such as, for example, email, push notification, personalize snail mail catalogue, etc., including combinations or variations thereof.

The storage interface (I/F) module 280 is configured to interface with the model data store 285 and the product data store 295. Although shown as included as part of the object compatibility and retargeting service, it is appreciated that one or both of the model data store 285 and the product data store 295 may be distinct and/or distributed entities capable of communicating with the object compatibility and retargeting service 200 over one or more networks.

Figure 3:
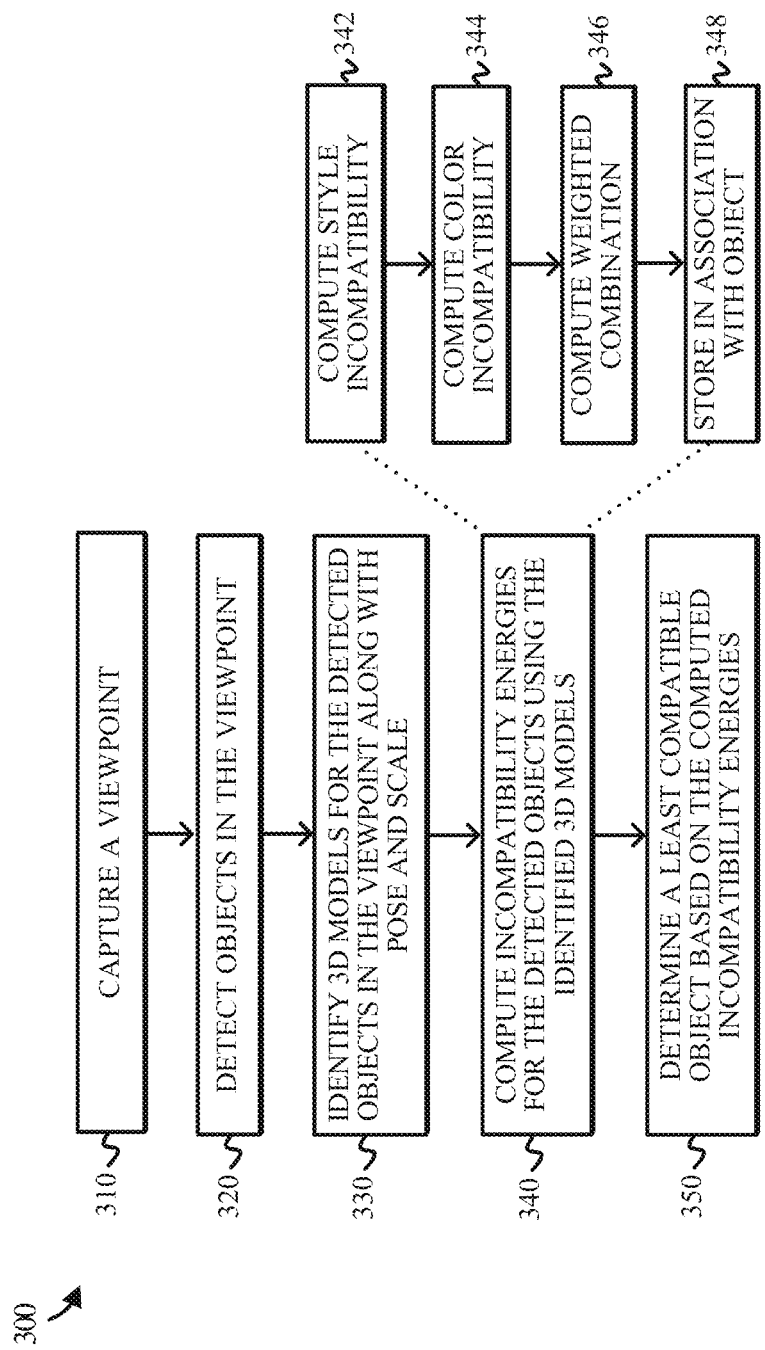
FIG. 3 depicts a flow diagram illustrating an example least compatible object detection process, according to some implementations.

FIG. 3 depicts a flow diagram illustrating an example least compatible object detection process 300 for determining a least compatible object/product in a viewpoint, according to some implementations. The example least compatible object detection process 300 may be performed in various implementations by an object compatibility and retargeting service employed by a digital content campaign platform such as, for example, digital content campaign platform 140 of FIGS. 1A and 1B, which employs an object compatibility and retargeting service 145, or one or more processors, modules, engines, or components associated therewith.

To begin, at 310, the object compatibility and retargeting service captures a viewpoint from which the object compatibility and retargeting service determines compatibility of objects contained therein for identification and replacement of the least compatible object with a more compatible object/product. More specifically, the object compatibility and retargeting service processes and/or otherwise analyzes visual data (e.g., visual data 112 of FIG. 1) provided by a client device to identify and/or otherwise select a viewpoint (e.g., viewpoint 115 of FIG. 1). As discussed herein, the visual data can include one or more of a digital image, a video, or a digital representation of an augmented reality application session executing on the client device.

At 320, the object compatibility and retargeting service detects objects in the viewpoint. For example, the object compatibility and retargeting service can analyze, utilizing one or more neural networks, the captured viewpoint to detect real-world objects contained therein. In some implementations, at least one of the one or more neural networks utilized to detect the real-world objects within the viewpoint is a region-based convolutional neural network configured to generate proposed regions of the viewpoint with corresponding probabilities of containing objects.

At 330, the object compatibility and retargeting service identifies 3D models for the detected objects in the viewpoint along with pose and scale. More specifically, the object compatibility and retargeting service identifies a three-dimensional (3D) model for each of the identified real-world objects in the viewpoint along with pose and scale using a part-based 2D-3D alignment algorithm (also referred to herein as "2D-3D alignment algorithm"). Example operations of the 2D-3D alignment algorithm are discussed in greater detail with reference to FIGS. 5A and 5B.

At 340, the object compatibility and retargeting service computes incompatibility energies (or scores) for the detected objects using the identified 3D models. For example, for each detected object in the viewpoint, the object compatibility and retargeting service, using the corresponding 3D model, computes a style incompatibility (342), computes a color incompatibility (344), computes a total incompatibility energy using a weighted combination of the style incompatibility and the incompatibility (346), and stores the total weighted combination in associated with the detected object.

In some implementations, to compute the style incompatibility (342), the object compatibility and retargeting service, for each object of the identified real-world objects in the viewpoint, computes, using a style compatibility algorithm, the style incompatibility of the object in relation to the other of the identified real-world objects in the viewpoint. As discussed herein, the style incompatibility can be a score determined by comparing geometric features of a 3D model corresponding to the object with geometric features of 3D models corresponding to the other of the identified real-world objects in the viewpoint.

In some implementations, to compute the color incompatibility (344), the object compatibility and retargeting service, for each object of the identified real-world objects in the viewpoint, computes, using a color compatibility algorithm, the color incompatibility of the object in relation to the background of the viewpoint. As discussed herein, the color incompatibility can be a score determined based on comparing a color of the object to a theme of colors extracted from the background of the viewpoint.

Lastly, at 350, the object compatibility and retargeting service determines a least compatible object of the detected objects in the viewpoint based on the total incompatibility energies. More specifically, as discussed herein, the least compatible object in the viewpoint is the real-word object in the viewpoint having the highest overall incompatibility energy.

Figure 4:
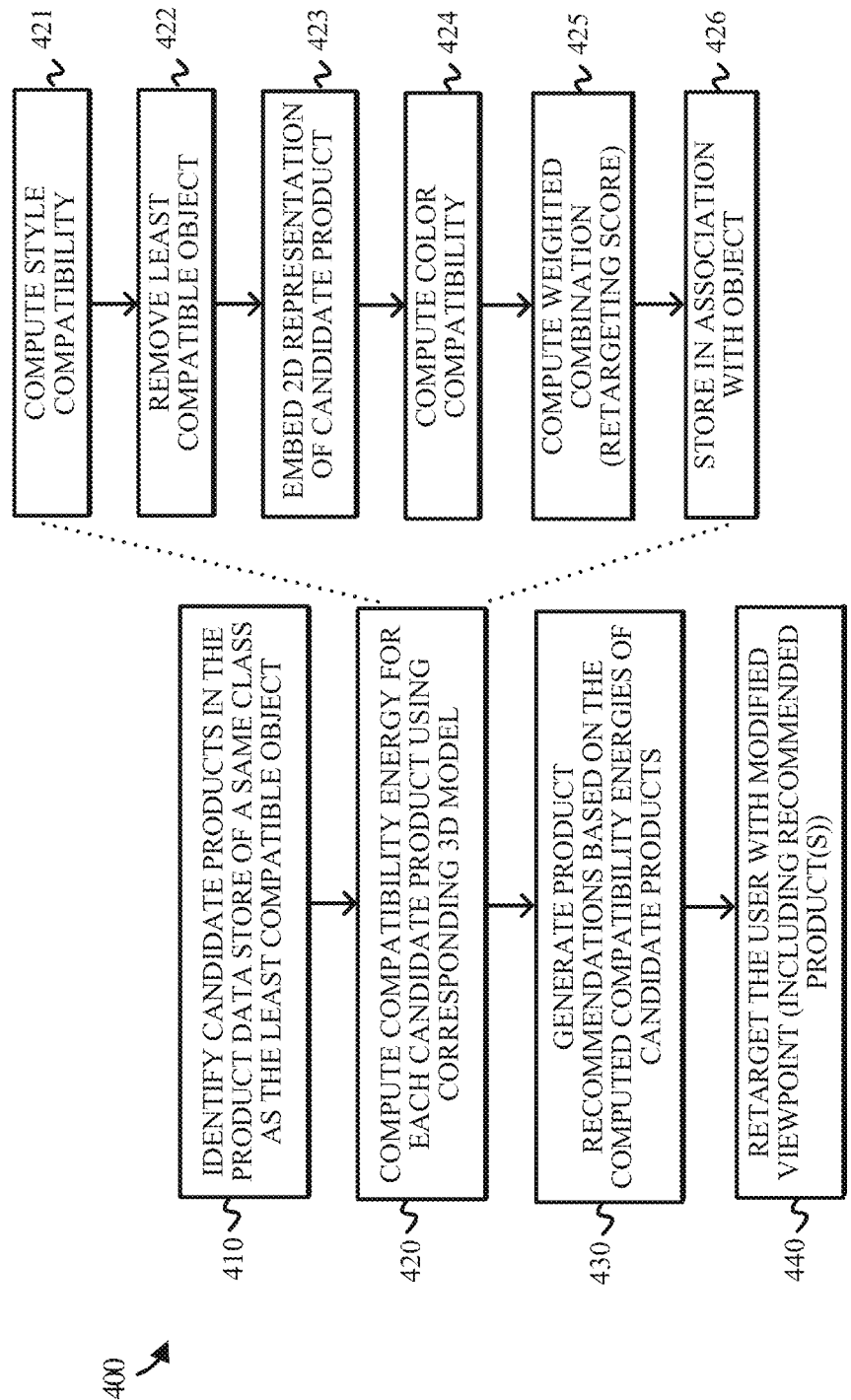
FIG. 4 depicts a flow diagram illustrating an example product identification and retargeting process, according to some implementations.

FIG. 4 depicts a flow diagram illustrating an example product identification and retargeting process 400 for identifying one or more product recommendations for replacing a least compatible object in a viewpoint and retargeting a user with a modified viewpoint, according to some implementations. The example product identification and retargeting process 400 may be performed in various implementations by an object compatibility and retargeting service employed by a digital content campaign platform such as, for example, digital content campaign platform 140 of FIGS. 1A and 1B, which employs an object compatibility and retargeting service 145, or one or more processors, modules, engines, or components associated therewith.

To begin, at 410, the object compatibility and retargeting service identifies candidate products in the product data store. As discussed herein, the one or more candidate products may be selected based on satisfying a compatibility threshold in relation to 3D models corresponding to real-world objects other than the least compatible object. For example, the multiple candidate products may have (or be of) a same product class or type as the least compatible object. Alternatively, the candidate products may be all of the products in the product data store or some other subset of the products, e.g., including multiple similar product classes or types (or some combination or variation of product subtypes).

At 420, the object compatibility and retargeting service computes a style compatibility energy (or score) for each of the candidate products using the corresponding 3D model. For example, for each candidate product, the object compatibility and retargeting service, using the corresponding 3D model, computes a style compatibility (421), removes the least compatible object (422), embeds a two-dimensional representation of the candidate product (423), computes a color compatibility (424), computes a total compatibility energy (or retargeting score) using a weighted combination of the style compatibility and the color compatibility (425), and stores the total weighted combination in associated with the candidate product.

In some implementations, to compute the style compatibility (421), the object compatibility and retargeting service, for each candidate product of multiple candidate products in the product data store, computes, using a style compatibility algorithm, the style compatibility of the candidate product in relation to a set of real-world objects in the viewpoint other than the least compatible object. As discussed herein, the style compatibility can be a score determined based on comparing geometric features of a 3D model corresponding to the candidate product with geometric features of 3D models corresponding to the set of real-world objects in the viewpoint other than the least compatible object.

In some implementations, to remove the least compatible object (422), the object compatibility and retargeting service, performs a context aware removal process. For example, using the bounding region identified for the least compatible object (e.g., during object detection), the object compatibility and retargeting service can utilize the Auto Selection technology (powered by Adobe Sensei®, which is present in current releases of Photoshop Elements) to find the precise object mask and remove the object using a Context Aware Fill technology (powered by Adobe Sensei®).

In some implementations, to embed a two-dimensional representation of the candidate product (423), the object compatibility and retargeting service embeds candidate product 3D models on or in the viewpoint at the same location in the viewpoint with same pose and scale as the removed least compatible object.

In some implementations, to compute the color compatibility (424), the object compatibility and retargeting service, for each candidate product of multiple candidate products in the product data store, computes, using a color compatibility algorithm, the color compatibility of the candidate product in relation to the background of the viewpoint. As discussed herein, the color compatibility can be a score determined based on comparing a color of the candidate product to a theme of colors extracted from the background of the viewpoint.

At 430, the object compatibility and retargeting service generates product recommendations based on the total compatibility energies (or retargeting scores) of the candidate products.

Lastly, at 440, the object compatibility and retargeting service retargets the user (that provided the captured viewpoint) with a modified viewpoint including the product recommendations.

Figure 5A:
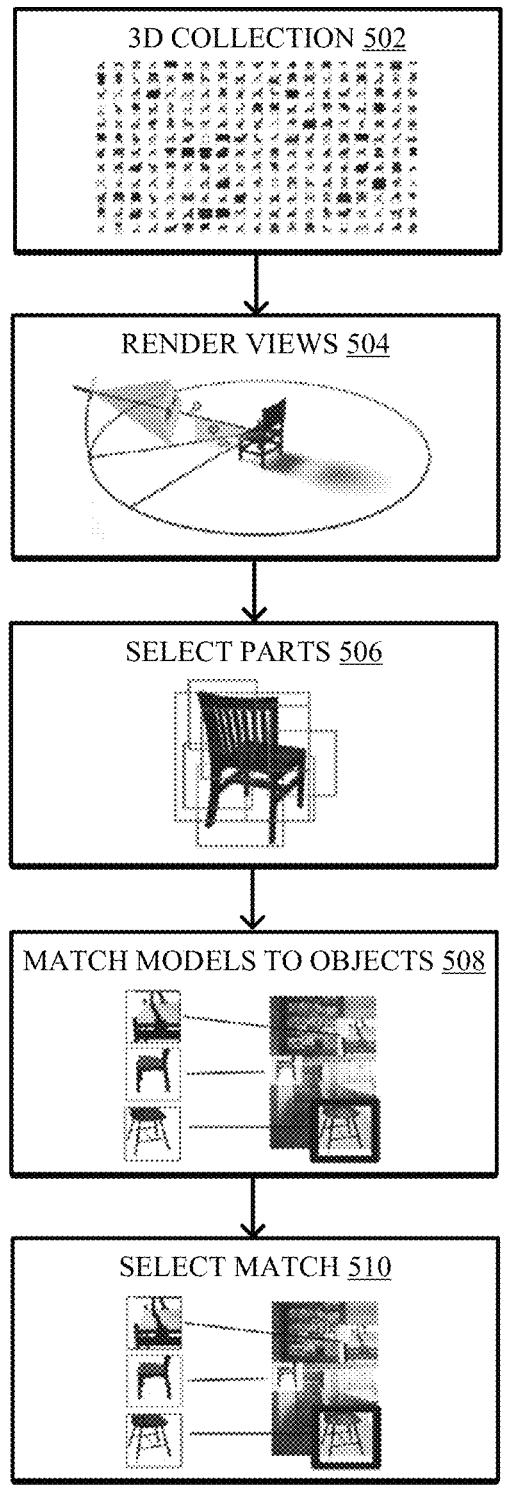
FIGS. 5A and 5B depict flow diagrams illustrating example operations of an alignment process for identifying a three-dimensional (3D) model from a model data store that most closely matches a two-dimensional real-world object detected in a viewpoint, according to some implementations.
Figure 5B:
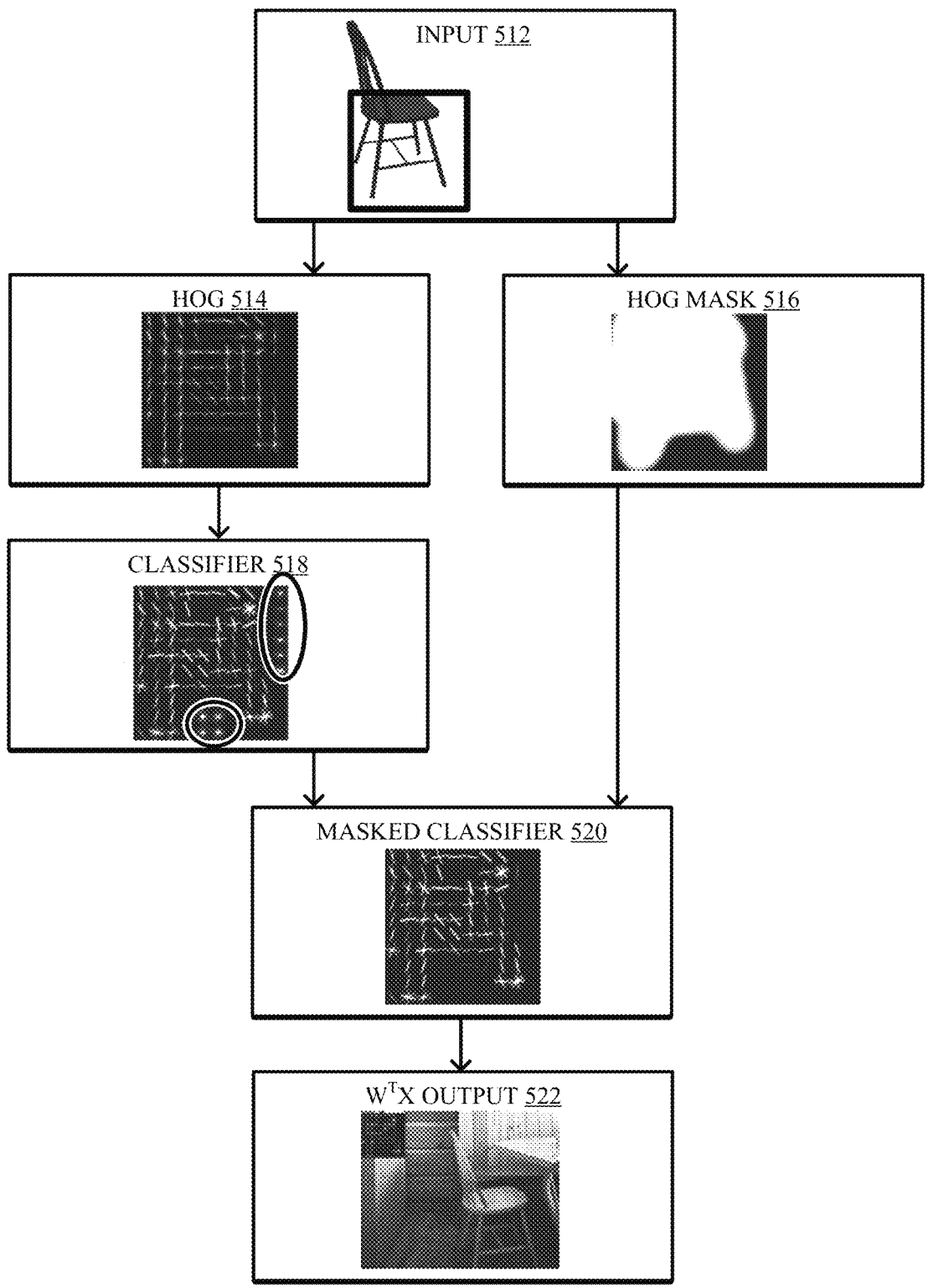

FIGS. 5A and 5B depict flow diagrams illustrating example operations of a 2D-3D alignment process for identifying a 3D model from a model data store that most closely matches a two-dimensional real-world object detected in a viewpoint, according to some implementations. The example operations may be performed in various implementations by an object compatibility and retargeting service employed by a digital content campaign platform such as, for example, digital content campaign platform 140 of FIGS. 1A and 1B, which employs an object compatibility and retargeting service 145, or one or more processors, modules, engines, or components associated therewith.

Referring first to FIG. 5A, initially, the object compatibility and retargeting service accesses a 3D collection 502 of 3D models within a model data store (e.g., model data store 285 of FIG. 2). The object compatibility and retargeting service then analyzes the 3D models to identify the 3D models having object labels that match an object label associated with the two-dimensional real-world object detected in the viewpoint. For example, if the two-dimensional real-world object detected in the viewpoint has an object label 'chair,' then the object compatibility and retargeting service analyzes the 3D models having the same label (type or class) 'chair' within the model data store.

In analyzing chairs within the model data store 112, the object compatibility and retargeting service analyzes chairs of various styles, each at different orientations to establish part-based correspondences between the 3D models and the two-dimensional real-world object detected in the viewpoint.

At 504, the object compatibility and retargeting service renders various views of a given 3D model. In some implementations, the object compatibility and retargeting service represents a given 3D model using a set of view-dependent mid-level visual elements learned from synthesized views in a discriminative fashion. To render the various views of the 3D model, the object compatibility and retargeting service searches for a patch x* in the input image (e.g., the capture viewpoint) that maximizes the following linear classifier score that is dependent on q:

$$S_q(x) = w_q^T x$$

where $w_q$ is a vector of learned weights for the classifier dependent on q, wherein the weight $w_q$ emphasizes feature dimensions that are discriminative for a patch's appearance. Indeed, as described in further detail below with reference to FIG. 5B, the object compatibility and retargeting service determines a visual element that corresponds to an identified real-world object based on the classifier score $w_q^T x$.

Given a rendered view for a given 3D model, the object compatibility and retargeting service learns the weights $w_q$ by training an exemplar classifier using the patch q as a single positive example and a large number of negative patches $x_i$ for i=1 to N. In some implementations, the object compatibility and retargeting service determines $w_q$ analytically via a linear discriminant analysis ("LDA"). Thus, the object compatibility and retargeting service can represent weights as follows:

$$w_q = \Sigma^{-1}(q - \mu_n)$$

where $$\mu_n = \frac{1}{N}\Sigma_{i=1}^{N} x_i$$

and the object compatibility and retargeting service $$\Sigma = \frac{1}{N}\Sigma_{i=1}^{N}(x_i - \mu_n)(x_i - \mu_n)^T$$

from a large set of histogram of oriented gradients ("HOG") descriptors $\{x_i\}$ extracted from patches sampled from a set of negative images.

At 506, the object compatibility and retargeting service selects parts of a 3D model to test for matching to the two-dimensional real-world object. Indeed, the object compatibility and retargeting service calibrates individual element detectors of the 2D-3D alignment algorithm based on a common dataset of negative images (e.g., images that do not contain the two-dimensional real-world object of interest). For instance, the object compatibility and retargeting service utilizes the following affine calibration of the equation mentioned above in relation to act 504:

$$S_q'(x) = a_q S_q(x) + b_q$$

where for each visual element detector the AR product recommendation system 102 seeks to find the scalars $a_q$ and $b_q$.

At 508, the object compatibility and retargeting service matches visual elements of the 3D model to the two-dimensional real-world object for small mutual deformations while preserving viewing angle and style constraints. To test a 3D model for similarity to the two-dimensional real-world object, the object compatibility and retargeting service applies all learned visual elements of the 3D model to those of the two-dimensional real-world object in parallel. In this manner, the object compatibility and retargeting service determines a spatially consistent and appearance-consistent alignment to the two-dimensional real-world object, while preserving style compatibility restraints.

To elaborate on how the object compatibility and retargeting service matches a 3D model to a two-dimensional real-world object based on selected parts, the object compatibility and retargeting service enforces a consistent spatial layout of visual element detections corresponding to a rendered view of a 3D model. More specifically, for all visual elements for a given view of a 3D model, the object compatibility and retargeting service determines a dense response map across different spatial scales of the (two-dimensional) captured viewpoint. For each visual element, the object compatibility and retargeting service considers the two-dimensional patch locations whose response exceeds a particular threshold, and the object compatibility and retargeting service utilizes these patches to determine detection scores of remaining visual elements centered around their expected two-dimensional locations.

At 510, the object compatibility and retargeting service selects the best match for the two-dimensional real-world object.

Referring next to FIG. 5B, as part of identifying a 3D model that matches an identified real-world object, FIG. 5B illustrates applying a histogram of oriented gradients ("HOG") classifier technique to 3D models stored within the model data store.

At 512, the object compatibility and retargeting service selects a visual element of a particular 3D model (e.g., the chair). In addition, the object compatibility and retargeting service selects discriminative visual elements by densely determining the squared whitened norm response at multiple spatial scales. In some implementations, the object compatibility and retargeting service selects a particular number (e.g., 10) of visual elements per rendered 3D view of a 3D model. In particular, the object compatibility and retargeting service selects visual elements that have the highest response after non-maximum suppression.

For non-maximum suppression, the object compatibility and retargeting service can implement an appropriate intersection-area-to-union ratio (e.g., 0.25). The object compatibility and retargeting service can further utilize square patches of particular dimensions (e.g., 100 by 100 pixels) to select visual elements (e.g., visual element 512). By filtering visual elements in this way, the object compatibility and retargeting service removes small, spurious patches that could be considered "noise" in the analysis.

At 514, the object compatibility and retargeting service further applies a HOG to extract contrast-insensitive features from HOG cells of a given dimension (e.g., 10 by 10 pixels) to product a feature vector of a particular dimension (e.g., 900 dimensions). The object compatibility and retargeting service can also set to zero components of $w_q$ that correspond to spatial bins that have a sum of absolute values across the HOG channels less than a given value (e.g., 0.01). For example, at 516, the object compatibility and retargeting service can apply a HOG mask to the visual element.

At 518, the object compatibility and retargeting service applies a classifier to the HOG and, at 520, generates a masked classifier based on the classifier applied to the HOG. By applying the HOG mask, the object compatibility and retargeting service, can reduce the effect of gradients in the classifier that are not relevant to the visual element (e.g., the circled gradients shown in the classifier at 518). Indeed, by applying the HOG mask, the object compatibility and retargeting service thereby effectively down weights background (e.g., white) pixels within the rendered views and focuses detector weights on the foreground 3D model (e.g., the chair). Accordingly, the object compatibility and retargeting service generates the masked classifier 520 to identify a visual element (e.g., visual element 512) that corresponds to an identified real-world object based on the classifier score $w_q^T x$.

In some implementations, the object compatibility and retargeting service utilizes the 2D-3D alignment algorithm described in Mathieu Aubry, Daniel Maturana, Alexei A. Efros, Bryan C. Russell, Josef Sivic, *Seeing 3D Chairs: Exemplar Part-based 2D-3D Alignment Using a Large Dataset of CAD Models*, CVPR (2014), which is incorporated by reference herein in its entirety.

Figure 6:
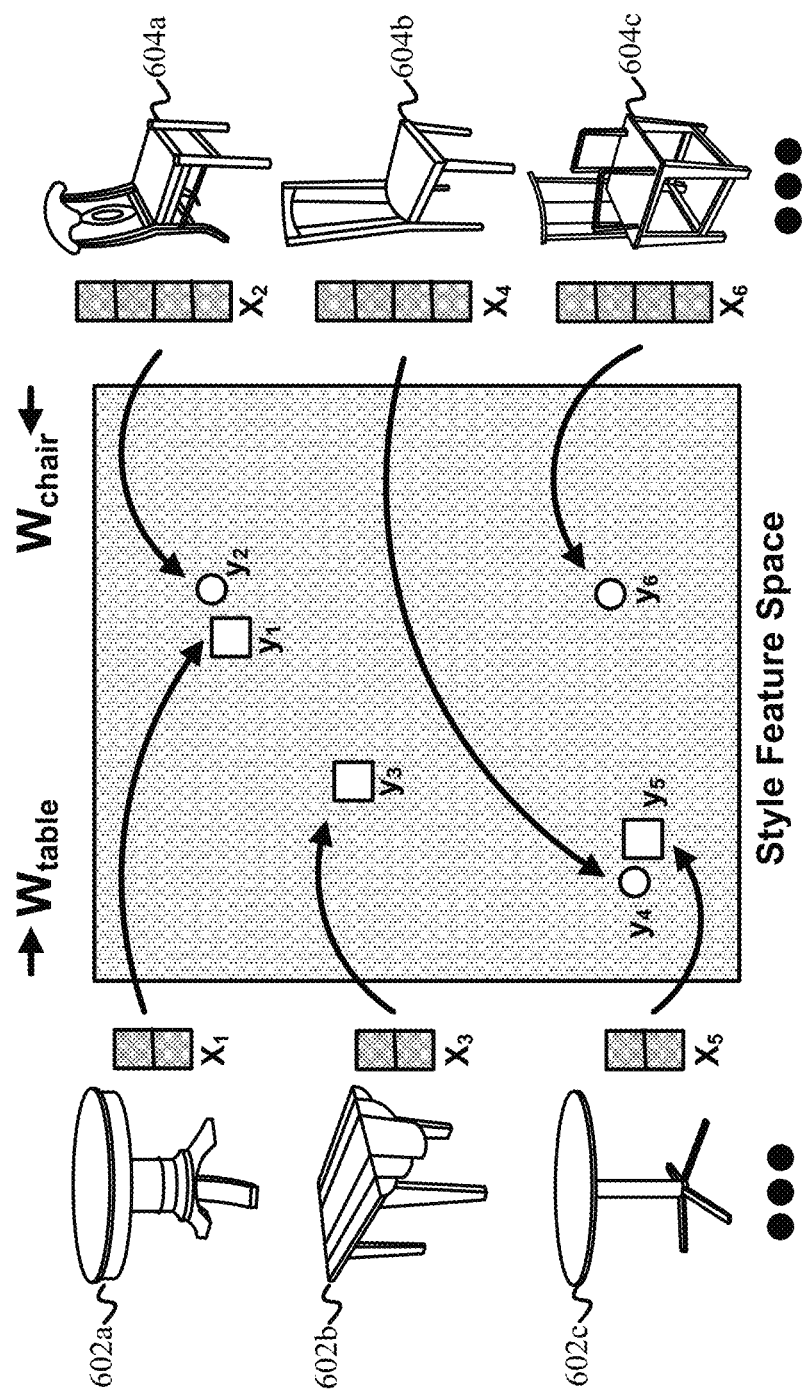
FIG. 6 depicts a visual representation illustrating operations of an object compatibility and retargeting service utilizing a style compatibility algorithm to determine both style compatibility and style incompatibility, according to some implementations.

FIG. 6 depicts a visual representation illustrating example operations of an object compatibility and retargeting service utilizing a style compatibility algorithm for determining style compatibility and/or incompatibility, according to some implementations. Operations of the object compatibility and retargeting service utilizing a color compatibility algorithm for determining color compatibility and/or incompatibility are also discussed in addition to example computations of total compatibility and/or incompatibility energy As discussed herein, the object compatibility and retargeting service is configured to utilize the style and color compatibility algorithms for determination of a least compatible object/product in a captured viewpoint (incompatibility determinations) and for generation of recommended products to replace the least compatible object/product in the captured viewpoint (compatibility determinations).

To elaborate on implementing the style compatibility algorithm, the object compatibility and retargeting service utilizes crowdsourced preference data (e.g., collected via AMAZON MECHANICAL TURK) about which products people consider to be compatible. The object compatibility and retargeting service performs a consistent segmentation of 3D models of products within a single product class and determines a part-aware geometric feature vector for each product model. In addition, the object compatibility and retargeting service trains a compatibility model based on a compatibility metric using the part-aware geometric features and crowdsourced preferences.

More specifically, the object compatibility and retargeting service collects data for determining object compatibility using crowdsourcing techniques. To illustrate, the object compatibility and retargeting service utilizes a crowdsourcing platform such as AMAZON MECHANICAL TURK to gather user preferences in the form of triplets (e.g., A, B, C). Each triplet represents a human evaluation of whether reference product/object A is more compatible with product/object B or with product/object C. For example, the object compatibility and retargeting service can present a question to a rating user such as, given sofa A, is chair B or chair C more compatible? Generally, product/object B and product/object C are in the same product class (e.g., chair) while product/object A is from a different product class (e.g., sofa).

Based on the crowdsourced compatibility data, the object compatibility and retargeting service generates a feature vector x of geometric properties that are indicative of a style of a product or object. For instance, as part of the style compatibility algorithm, the object compatibility and retargeting service performs a consistent segmentation of all products/objects within the same product class and generates geometric features for each segmented part individually. The object compatibility and retargeting service further represents each product by concatenating feature vectors that represent the geometric features for all parts of the product as well as its entire shape. Advantageously, the object compatibility and retargeting service thus maintains distinctive features separately without blending features of a product together. As a result, the object compatibility and retargeting service generates a part-aware geometric feature vector that is better suited for characterizing styles of products and/or objects.

Given the crowdsourced triplet data and the part-aware geometric features, the object compatibility and retargeting service learns a measure of compatibility between a pair of products from different product classes. To illustrate, let $x_1$, $x_1$ be feature vectors for products i and j (possibly of different dimensionalities), respectively. Accordingly, d ($x_i$, $x_j$) denotes a distance function whereby the object compatibility and retargeting service can determine a compatibility distance, where lower distances correspond to a higher compatibility.

Indeed, the object compatibility and retargeting service can determine a compatibility distance given by:

$$d_{asymm}(x_i,x_j)=\|W_{c(i)}x_i-W_{c(j)}x_j\|_2$$

where $W_c$ is represented as a K×D embedding matrix that projects the input feature into a K-dimensional space for comparison. In order to process heterogeneous product classes, the object compatibility and retargeting service learns separate embedding matrix $W_c$ for each class c.

In other words, the object compatibility and retargeting service compares objects/products by projecting them into a shared K-dimensional embedding space while using a separate projection matrix for each product class. To illustrate from the example of FIG. 6, the object compatibility and retargeting service projects a table 602a (represented by the feature vector $x_1$) as $y_i=W_{table}x_1$ in feature space. The object compatibility and retargeting service further compares the table 602a with a chair 604a (represented by the feature vector $x_2$) that the object compatibility and retargeting service projects in the style feature space as $y_2=W_{chair}x_2$. Indeed, the object compatibility and retargeting service can compare the table 602a with the chair 604a by determining the asymmetric embedding distance between $y_1$ and $y_2$ in the style feature space.

Since there are multiple identified real-world objects in a viewpoint, for each identified object, the incompatibility energy is defined as the sum of its stylistic incompatibility score with other objects in the viewpoint:

$$SIE_i = F_{Incompatiblity}(x_i) = \sum_{x_j \in \mathcal{P}-x_i} d(x_i, x_j)$$

where $x_i$ represents a model (associated with the subject identified object) in the viewpoint, $\mathcal{P}$ represents a set of models (associated with the identified objects) in the viewpoint, and d ($x_i$, $x_j$) represents the incompatibility measure (or distance) between $x_i$ and $x_j$. Thus, the incompatibility energy for each real identified real-world object in the viewpoint can be identified. As discussed herein, the energy/score F can then be normalized to a value ranging in [0,1].

Likewise, to compute compatibility of product candidates for selection of product recommendations, since there are multiple identified product candidates in a product database, for each candidate product, the compatibility energy is defined as the sum of its stylistic compatibility score with other objects in the viewpoint:

$$F_{compatiblity}(x_i) = \sum_{(x_i,x_j) \in \mathcal{P}'} d(x_i, x_j)$$

where $x_i$ represents a model (associated with the subject product candidate) embedded in the viewpoint, $\mathcal{P}'$ represents a set of models (associated with the other identified objects i.e identified objects excluding the least compatible one) in the viewpoint, and d ($x_i$, $x_j$) represents the compatibility measure (or distance) between $x_i$ and $x_j$.

By following this process, as illustrated in FIG. 6, the object compatibility and retargeting service can compare the identified objects/products from different classes. Indeed, as shown, the object compatibility and retargeting service can compare tables 602a, 602b, and 602c with chairs 604a, 604b, and 604c by determining distances between respective feature space projections. For instance, the object compatibility and retargeting service can determine a compatibility score between the table 602c and the chair 604b and can determine another compatibility score between the table 602c and the chair 604c to determine that chair 604b is more compatible with table 602c—because $y_4$ is closer than $y_6$ to $y_5$.

In some implementations, in relation to the discussion of FIG. 6, the object compatibility and retargeting service utilizes the style compatibility algorithm described in Tianqiang Liu, Aaron Hertmann, Wilmot Li, Thomas Funkhouser, *Style Compatibility for 3D Furniture Models*, ACM Transactions on Graphics (2015), which is incorporated herein by reference in its entirety.

As discussed herein, the object compatibility and retargeting service further implements a color compatibility algorithm. More specifically, like the style compatibility algorithm, the object compatibility and retargeting service is configured to utilize the color compatibility algorithm for determination of a least compatible object/product in a captured viewpoint (incompatibility determination) and for generation of recommended products to replace the least compatible object/product in the captured viewpoint (compatibility determination), according to some embodiments.

To elaborate on implementing the color compatibility algorithm, the object compatibility and retargeting service utilizes a color compatibility algorithm to select textures that are color-compatible with the scene depicted within the viewpoint. As part of the color compatibility algorithm, the object compatibility and retargeting service determines a color compatibility measure by extracting a theme of a given number (e.g., five) colors from a viewpoint. To extract the color theme, the object compatibility and retargeting service minimizes an objective function to represent or suggest an image:

$$\max_t \alpha \cdot r(t) - \frac{1}{N}\sum_i \min_{1 \le k \le 5} (\max(\|c_i - t_k\|_2, \sigma)) - \frac{\tau}{M}\max_k \sum_{j \in N(t_k)} \max(\|c_j - t_k\|_2, \sigma)$$

where r(t) is a rating of theme t, $c_i$ is a pixel color, $t_k$ is a theme color, N is the total number of pixels, σ is a distance threshold, and α and τ are the learning rate parameters. By utilizing the first term, $$\max_t \alpha \cdot r(t),$$

the object compatibility and retargeting service measures the quality of the extracted theme. By utilizing the second term, $$\frac{1}{N}\Sigma_i \min_{1 \le k \le 5}(\max(\|c_i - t_k\|_2, \sigma)),$$

the object compatibility and retargeting service penalizes dissimilarity between each image pixel $c_i$ and the most similar color $t_k$ within the theme. By utilizing the third term, $$\frac{\tau}{M}\max_k \Sigma_{j \in N(t_k)} \max(\|c_j - t_k\|_2, \sigma),$$

the object compatibility and retargeting service penalizes dissimilarity between theme colors $t_k$ and the M most similar image pixels N(t) to prevent theme colors from drifting from the image.

In some embodiments, the object compatibility and retargeting service uses set values such as M=N/20, $\tau$=0.025, $\alpha$=3, and $\sigma$=5. In addition, the object compatibility and retargeting service can utilize a DIRECT algorithm for optimization to perform a deterministic global search without requiring overly-intensive initialization. For example, the object compatibility and retargeting service can utilize the DIRECT algorithm as set forth in Donald R. Jones, Cary D. Perttunen, Bruce E. Stuckman, *Lipschitzian Optimization Without the Lipschitz Constant*, Journal of Optimization Theory and Applications 79.1, 157-181 (1993), which is incorporated herein by reference in its entirety.

The object compatibility and retargeting service thus generates themes of a set number of colors (e.g., five) and scores each theme using a regression model. Indeed, the object compatibility and retargeting service generates, from an input theme t, a feature vector of a number of features including colors, differences, principal component analysis ("PCA") features, hue probability, hue entropy, etc.

In addition, the object compatibility and retargeting service can utilize a LASSO ("least absolute shrinkage and selection operator") regression model with an L1 norm on the weights to apply to the generated feature vector y(t). In this manner, the object compatibility and retargeting service automatically selects the most relevant features and rates a given color theme on a scale from 1 to 5. The object compatibility and retargeting service can utilize a LASSO regressor that is a linear function of the features given by:

$$r(t)=w^T y(t)+b$$

learned with L1 regularization:

$$\min_{w,b} \sum_i (w^T y_i + b - r_i)^2 + \lambda\|w\|_1$$

where r(t) is the predicted rating of the input theme, and w and b are the learned parameters. Thus, for each embedded object corresponding to a candidate product within the viewpoint, the object compatibility and retargeting service extracts a theme and passes the theme through the regression model. Accordingly, for the $i^{th}$ candidate, if $t_i$ is the extracted theme, the object compatibility and retargeting service associates a normalized score $\beta_i$ that denotes its color compatibility with the viewpoint on a scale from 0 to 1.

In some implementations, the object compatibility and retargeting service generates the color compatibility as follows:

$$\beta_i = \frac{r(t_i) - 1}{5 - 1}$$

where the user-based ratings range from 1 to 5. In this way, the object compatibility and retargeting service generates the color compatibility score by subtracting the rating by a minimum possible rating and then dividing the result by the difference of the maximum possible rating and a minimum possible rating (e.g., 5-1).

To compute color incompatibility energy, the object compatibility and retargeting service first computes the viewpoint image's color compatibility score ($\beta_v$) as discussed above. Then, for an identified object in the viewpoint the object compatibility and retargeting service knows the bounding box region and can use the Auto Selection technology (powered by Adobe Sensei) to find the precise object mask and fill that region with white color.

For this modified image (corresponding to an identified object i), object compatibility and retargeting service follows the same algorithm as that for the viewpoint image to get the color compatibility score for that modified image ($\beta_i$). This gives the color compatibility score of the image without that object. The reason for whitening the object region is that white color is a neutral color and is considered as a surface for comparing or visualizing colors and the white color does not come out as a dominant color in the theme extracted for the modified image. The object compatibility and retargeting service then subtracts the color compatibility score for the viewpoint image from the color compatibility score for the modified image to get the color incompatibility energy ($CIE_i$) for the identified object under consideration. This process is repeated for each relevant identified object to get its color incompatibility energy. For the $i_{th}$ identified object, the color incompatibility energy ($CIE_i$) is defined as follows:

$$CIE_i = \beta_v - \beta_i$$

In some implementations, the object compatibility and retargeting service utilizes the color compatibility algorithm set forth in Peter O'Donovan, Aseem Agarwala, Aaron Hertmann, *Color Compatibility from Large Datasets*, ACM Transactions on Graphics, 30, 43, Proc. SIGGRAPH (2011), which is incorporated herein by reference in its entirety.

As discussed herein, the overall incompatibility energy can be computed once the style and the color incompatibility energies are computed and normalized. Specifically, the object compatibility and retargeting service formulates an overall incompatibility energy associated with the $i_{th}$ $OIE_i$ object, assuming it to be a linear combination of the above two scores, i.e., $$OIE_i = w_1 * SIE_i + w_2 * CIE_i$$

where, $w_1$ denotes the weight of the style incompatibility energy and $w_2$ denotes the weight of the color incompatibility energy, $SIE_i$ denotes the normalized style incompatibility energy of the $i_{th}$ identified object, and $CIE_i$ denotes color incompatibility energy of the $i_{th}$ identified object.

In some implementations, to compute the weights $w_1$ and $w_2$, the object compatibility and retargeting service can use a Rank-SVM algorithm that employs a pair-wise ranking method. The input to the Rank-SVM algorithm can be a ground truth ranking of the objects having certain scores. The Rank-SVM algorithm determines the weights corresponding to each of the scores denoting their importance in ranking. As discussed herein, the object with the highest overall incompatibility energy is selected as the least compatible object in a viewpoint. Likewise, the one or more product candidates with the highest compatibility energies are selected as product recommendations.

FIGS. 7-11 depict additional example operations of an object compatibility and retargeting service for identifying and replacing a least compatible object in a two-dimensional digital representation of a real-world environment, according to some implementations. The example operations are discussed primarily with reference to various components/modules of the object compatibility and retargeting service 200 of FIG. 2, although alternative configurations are possible.

Figure 7:
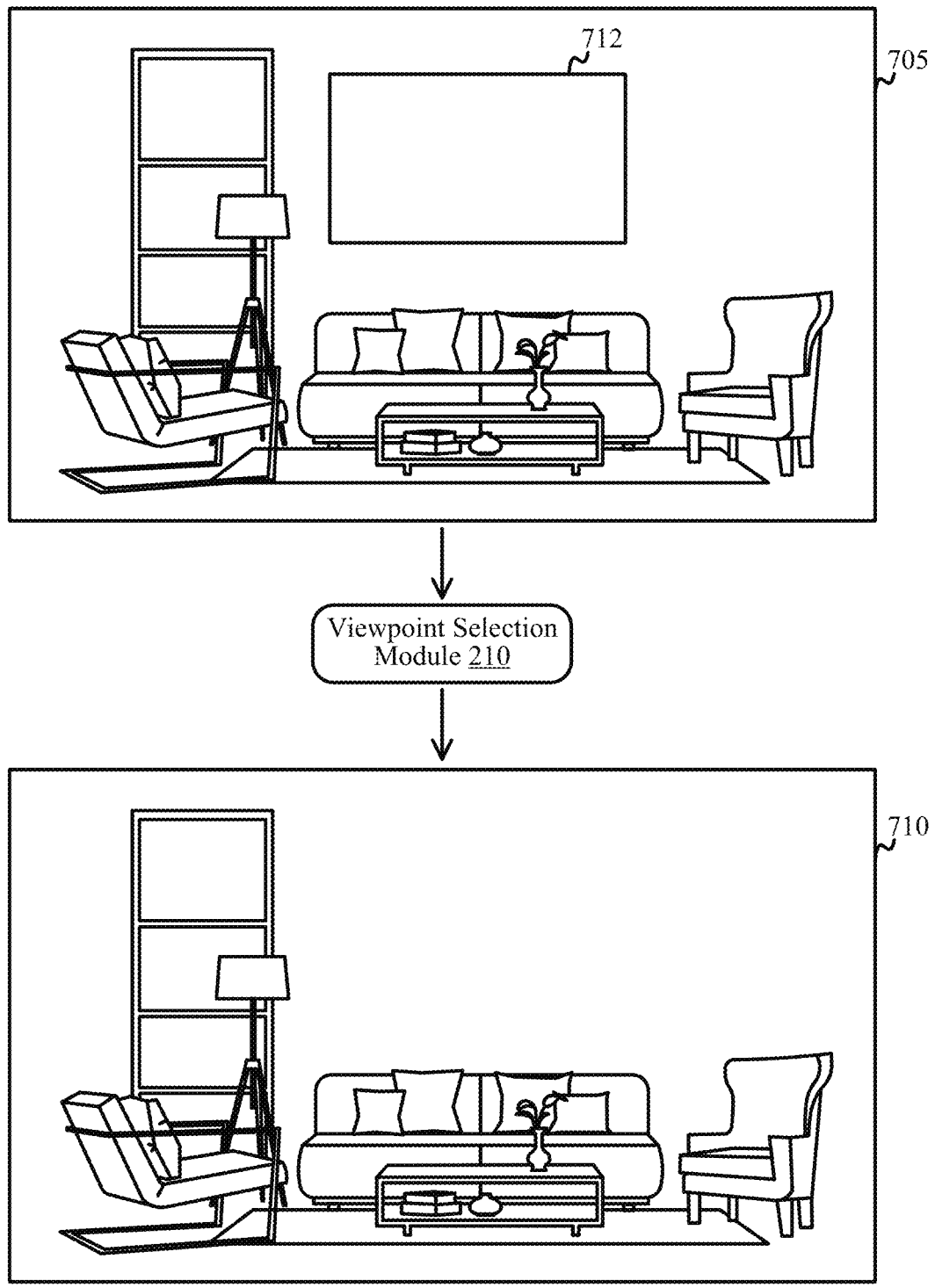
FIG. 7 depicts example operations of an object compatibility and retargeting service for capturing a viewpoint, according to some implementations.

Referring first to FIG. 7, initially, viewpoint selection module 210 processes and/or otherwise analyzes visual data (e.g., visual data 112 of FIG. 1) provided by a client device to capture, identify and/or otherwise select a viewpoint 710 from which the object compatibility and retargeting service can determine compatibility of the objects contained therein. As illustrated in the example of FIG. 7, a user is augmenting an object/product (e.g., wall painting 712) within (or with reference to) the visual data 705 that is received from a client device.

As discussed herein, the viewpoint 710 can be captured via any number of techniques. Likewise, the visual data can include one or more digital images, video, or visual representations that depict at least one scene or image from a real-world environment including multiple real-world objects. For example, the viewpoint selection module 210 may capture a viewpoint representative of a real-world environment from AR session data while a user selects and overlays one or more ancillary augmented products (e.g., wall painting 712) in the viewpoint within the AR session.

Referring next to FIG. 8, once viewpoint 710 is captured, object identification module 220 identifies relevant real-world objects (i.e., furniture objects 815a-815e) in the viewpoint utilizing one or more neural networks. The resulting intermediate viewpoint 710' is illustrative of the identification process.

Figure 9:
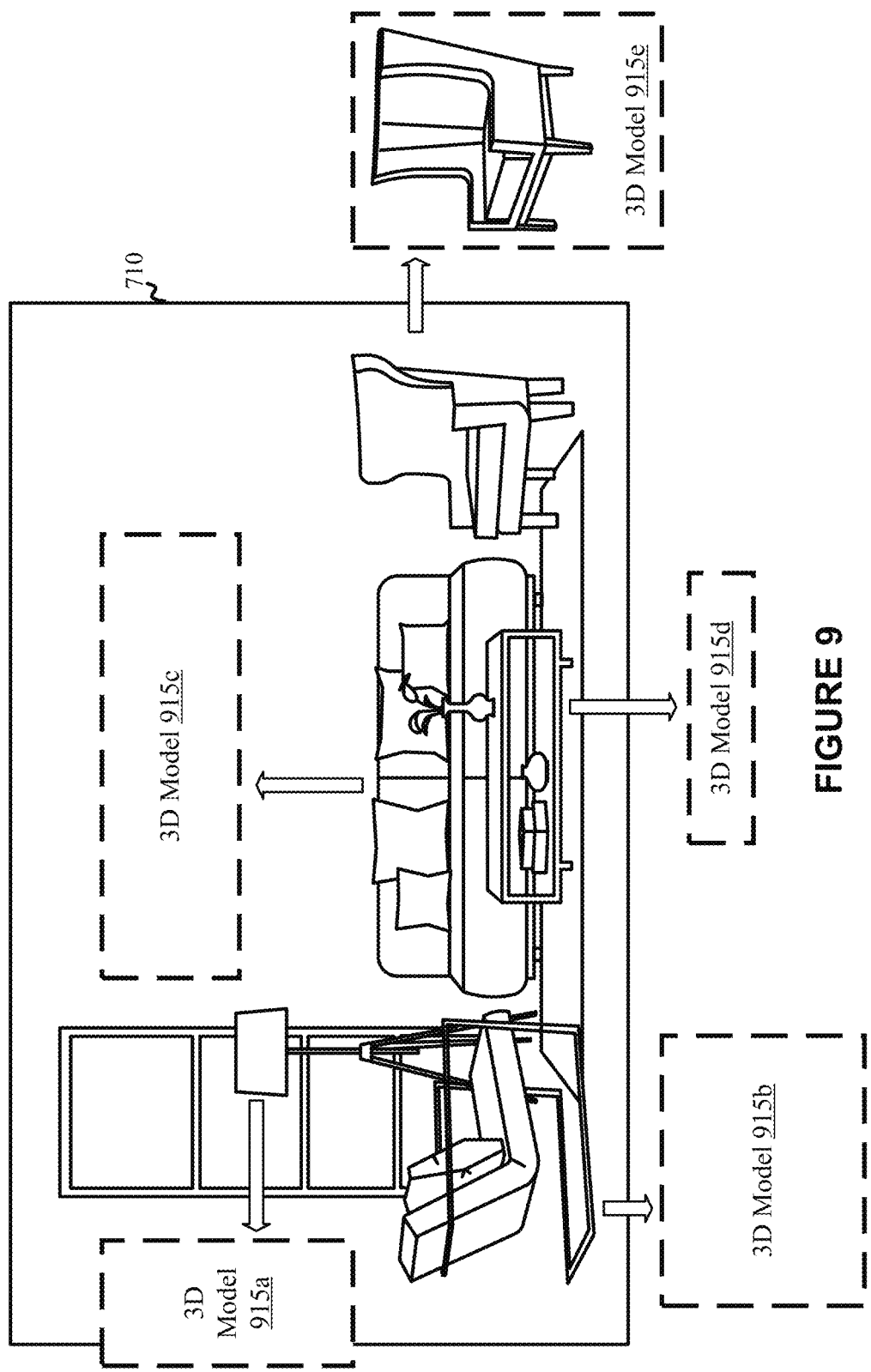
FIG. 9 depicts example operations of an object compatibility and retargeting service identifying 3D models for the identified objects in a viewpoint, according to some implementations.

In FIG. 9, 3D model identification module 230 finds matching 3D models 915a-915e for each detected two-dimensional real-world object (i.e., furniture objects 815a-815e) in the viewpoint 710 along with pose and scale. As discussed herein, to find the matching 3D models, the 3D model identification module 230 can utilizes the 2D-3D alignment algorithm to search the model data store 285. The object/product compatibility module 240 (not shown) then computes incompatibility energies (or scores) for each of the objects/products using a weighted combination of a style incompatibility of the object (using the model) in relation to other of the identified real-world objects (using the models) in the viewpoint and a color incompatibility of the object in relation to a background of the viewpoint.

As discussed above, the object/product compatibility module 240 then identifies the least compatible object in the viewpoint as the detected real-word object in the viewpoint having the highest overall incompatibility energy.

Figure 10:
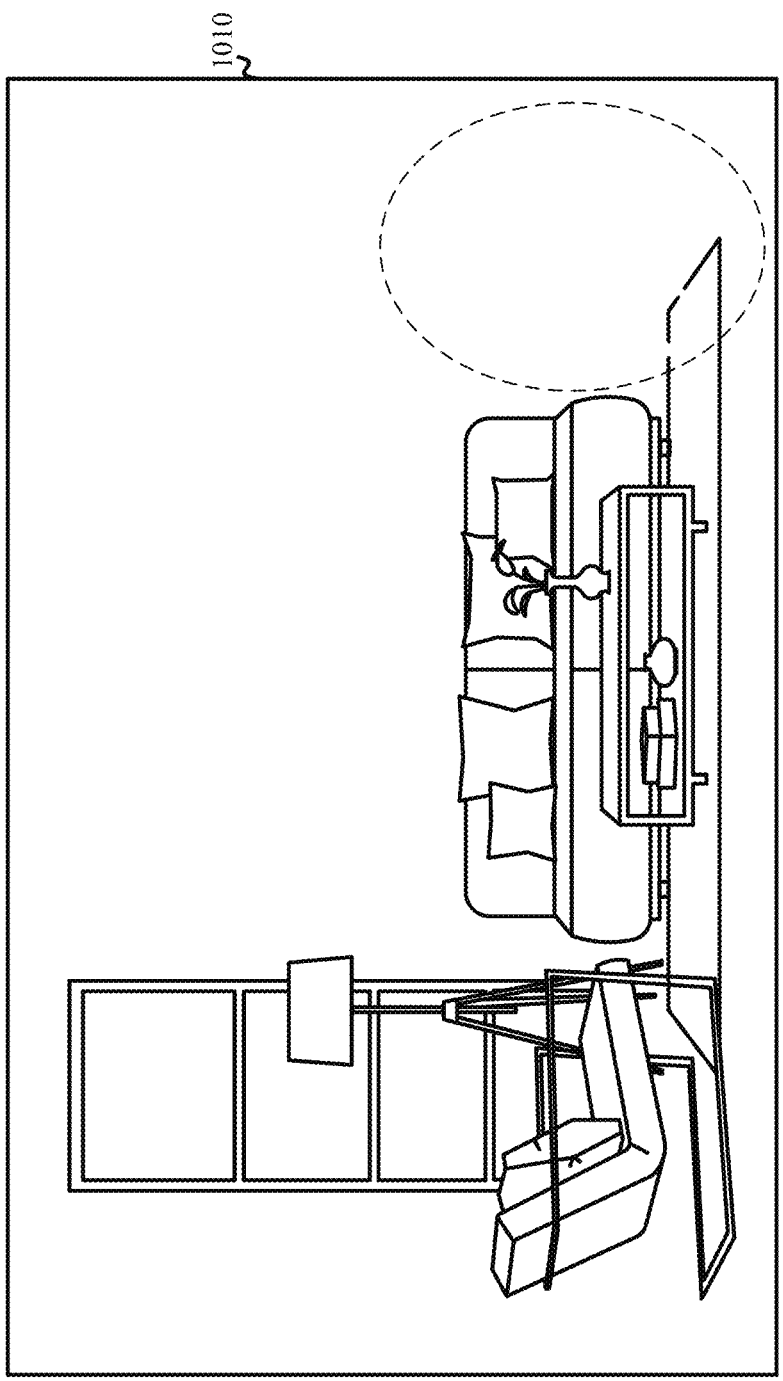
FIG. 10 depicts example operations of an object compatibility and retargeting service removing a least compatible object from a viewpoint for replacement (embedding of) a candidate product, according to some implementations.
Figure 11:
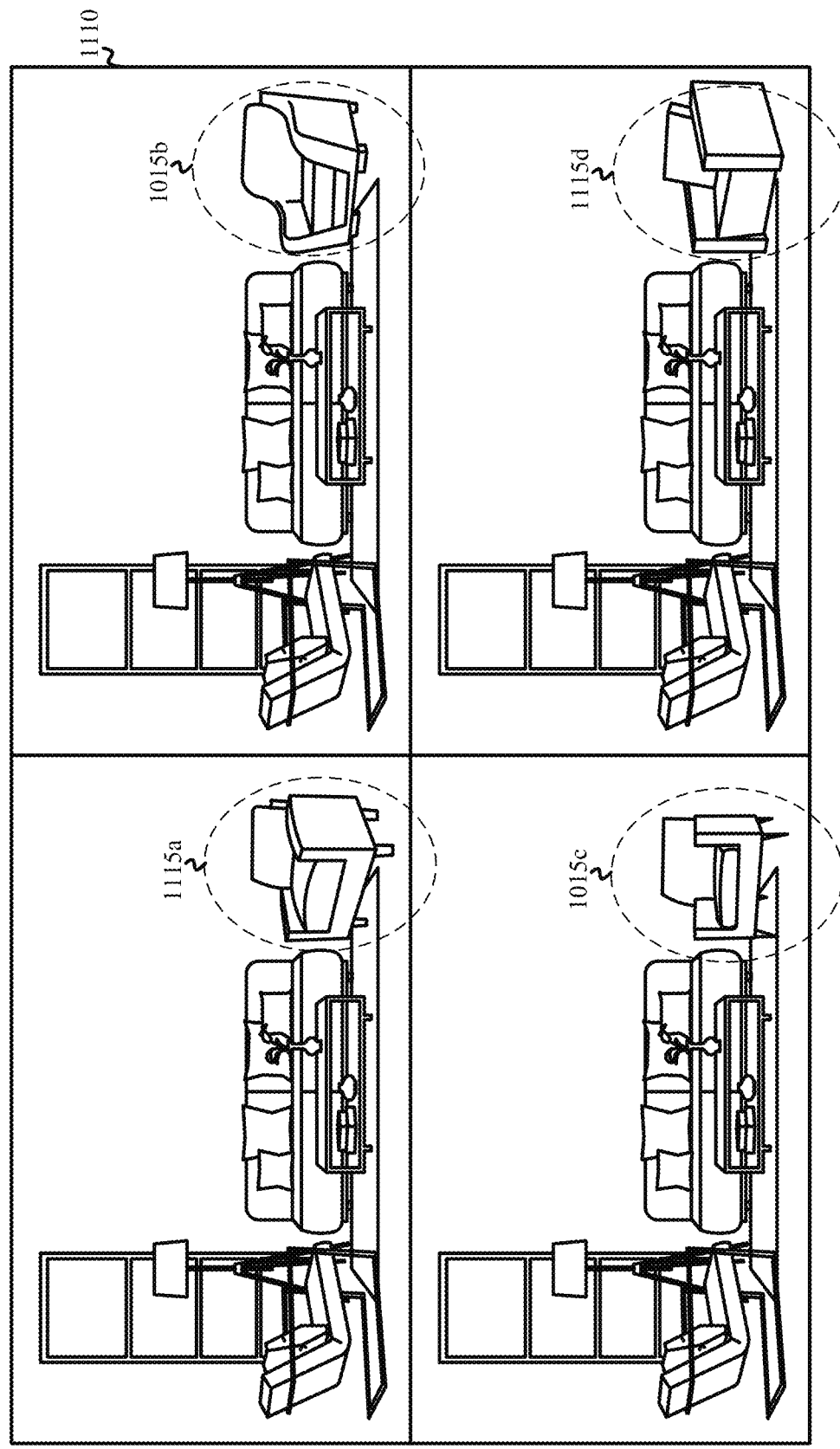
FIG. 11 depicts example operations of an object compatibility and retargeting service for providing product recommendations in place of the removed least compatible object, according to some implementations.

Referring next to FIG. 10, once the least compatible object in the viewpoint is detected, the product recommendation module 250 removes the least compatible object as shown in example intermediate viewpoint 1010 and, as shown in FIG. 11, identifies product candidates in the product data store that are more compatible in terms of style and color within the viewpoint. One or more of the most compatible product candidates are then selected as product recommendations and two-dimensional representations of the product recommendations 1115a-1115d are embedded or overlaid with the same (or similar) pose and scale as the removed least compatible object in a modified (or retargeted) viewpoint 1110. As discussed herein, a targeted communication including the modified (or retargeted) viewpoint 1110 can then be generated and provided to back to a user via one or more marketing channels.

FIG. 12 illustrates computing system 1201 that is representative of any system or collection of systems in which the various processes, programs, services, and scenarios disclosed herein may be implemented. Examples of computing system 1201 include, but are not limited to, server computers, cloud computing platforms, and data center equipment, as well as any other type of physical or virtual server machine, container, and any variation or combination thereof. Other examples include desktop computers, laptop computers, table computers, Internet of Things (IoT) devices, wearable devices, and any other physical or virtual combination or variation thereof.

Computing system 1201 may be implemented as a single apparatus, system, or device or may be implemented in a distributed manner as multiple apparatuses, systems, or devices. Computing system 1201 includes, but is not limited to, processing system 1202, storage system 1203, software 1205, communication interface system 1207, and user interface system 1209 (optional). Processing system 1202 is operatively coupled with storage system 1203, communication interface system 1207, and user interface system 1209.

Processing system 1202 loads and executes software 1205 from storage system 1203. Software 1205 includes and implements process 1206, which is representative of the processes discussed with respect to the preceding Figures. When executed by processing system 1202 to provide packet rerouting, software 1205 directs processing system 1202 to operate as described herein for at least the various processes, operational scenarios, and sequences discussed in the foregoing implementations. Computing system 1201 may optionally include additional devices, features, or functionality not discussed for purposes of brevity.

Referring still to FIG. 12, processing system 1202 may comprise a micro-processor and other circuitry that retrieves and executes software 1205 from storage system 1203. Processing system 1202 may be implemented within a single processing device but may also be distributed across multiple processing devices or sub-systems that cooperate in executing program instructions. Examples of processing system 1202 include general purpose central processing units, graphical processing units, application specific processors, and logic devices, as well as any other type of processing device, combinations, or variations thereof.

Storage system 1203 may comprise any computer readable storage media readable by processing system 1202 and capable of storing software 1205. Storage system 1203 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1203 may also include computer readable communication media over which at least some of software 1205 may be communicated internally or externally. Storage system 1203 may be implemented as a single storage device but may also be implemented across multiple storage devices or sub-systems co-located or distributed relative to each other. Storage system 1203 may comprise additional elements, such as a controller, capable of communicating with processing system 1202 or possibly other systems.

Software 1205 (including learning process 1206) may be implemented in program instructions and among other functions may, when executed by processing system 1202, direct processing system 1202 to operate as described with respect to the various operational scenarios, sequences, and processes illustrated herein. For example, software 1205 may include program instructions for implementing a object compatibility-based identification and replacement process for contextualized content delivery as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1205 may include additional processes, programs, or components, such as operating system software, virtualization software, or other application software. Software 1205 may also comprise firmware or some other form of machine-readable processing instructions executable by processing system 1202.

In general, software 1205 may, when loaded into processing system 1202 and executed, transform a suitable apparatus, system, or device (of which computing system 1201 is representative) overall from a general-purpose computing system into a special-purpose computing system customized to provide object compatibility-based identification and replacement of objects for contextualized content delivery. Indeed, encoding software 1205 on storage system 1203 may transform the physical structure of storage system 1203. The specific transformation of the physical structure may depend on various factors in different implementations of this description. Examples of such factors may include, but are not limited to, the technology used to implement the storage media of storage system 1203 and whether the computer-storage media are characterized as primary or secondary storage, as well as other factors.

For example, if the computer readable storage media are implemented as semiconductor-based memory, software 1205 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1207 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. One or more non-transitory computer readable storage media having program instructions stored thereon that, when executed by a processor, direct a computing apparatus to:
    analyze, utilizing one or more neural networks, a viewpoint depicting a two-dimensional digital representation of a real-world environment to identify real-world objects within the viewpoint;
    identify, utilizing a part-based alignment algorithm, a three-dimensional (3D) model for each of the identified real-world objects in the viewpoint along with pose and scale;
    utilizing the identified 3D models, determine an incompatibility of each object of the identified real-world objects in the viewpoint based on a weighted combination of:
        a style incompatibility of the object in relation to other of the identified real-world objects in the viewpoint, and
        a color incompatibility of the object in relation to a background of the viewpoint; and
    determine a least compatible object in the viewpoint based on the incompatibility of each object of the identified real-world objects in the viewpoint.

2. The one or more non-transitory computer readable storage media of claim 1, wherein the program instructions, when executed by the processor, further direct the computing apparatus to:

for each object of the identified real-world objects in the viewpoint:
compute, using a style compatibility algorithm, the style incompatibility of the object,
wherein the style incompatibility comprises a score determined by comparing geometric features of a 3D model corresponding to the object with geometric features of 3D models corresponding to the other of the identified real-world objects in the viewpoint.

3. The one or more non-transitory computer readable storage media of claim 1, wherein the program instructions, when executed by the processor, further direct the computing apparatus to:
for each object of the identified real-world objects in the viewpoint:
compute, using a color compatibility algorithm, the color incompatibility of the object,
wherein the color incompatibility comprises a score determined by comparing a color of the object to a theme of colors extracted from the background of the viewpoint.

4. The one or more non-transitory computer readable storage media of claim 1, wherein the program instructions, when executed by the processor, further direct the computing apparatus to:
generate a product recommendation based on a weighted combination of:
a style compatibility of the product recommendation in relation to a set of surrounding real-world objects in the viewpoint other than the least compatible object; and
a color compatibility of the product recommendation in relation to the background of the viewpoint.

5. The one or more non-transitory computer readable storage media of claim 4, wherein the program instructions, when executed by the processor, further direct the computing apparatus to:
for each candidate product of multiple candidate products in a product data store:
compute, using a style compatibility algorithm, the style compatibility of the candidate product,
wherein the style compatibility comprises a score determined by comparing geometric features of a 3D model corresponding to the candidate product with geometric features of 3D models corresponding to the set of surrounding real-world objects in the viewpoint.

6. The one or more non-transitory computer readable storage media of claim 5, wherein the multiple candidate products have a same product type as the least compatible object.

7. The one or more non-transitory computer readable storage media of claim 4, wherein the program instructions, when executed by the processor, further direct the computing apparatus to:
for each candidate product of multiple candidate products in a product data store:
compute, using a color compatibility algorithm, the color compatibility of the candidate product,
wherein the color compatibility comprises a score determined by comparing a color of the candidate product to a theme of colors extracted from the background of the viewpoint.

8. The one or more non-transitory computer readable storage media of claim 4, wherein the program instructions, when executed by the processor, further direct the computing apparatus to:
identify, utilizing the part-based alignment algorithm, a pose and scale of the least compatible object in the viewpoint;
generate a two-dimensional representation of the product recommendation with a pose and scale matching the pose and scale of the least compatible object; and
generate a modified viewpoint by:
removing the least compatible object from the viewpoint; and
embedding the two-dimensional representation of the product recommendation positioned at a location of the removed least compatible object.

9. The one or more non-transitory computer readable storage media of claim 8, wherein the program instructions, when executed by the processor, further direct the computing apparatus to:
generate a targeted communication including the modified viewpoint; and
provide the targeted communication to a user associated with the viewpoint via one or more marketing channels.

10. The one or more non-transitory computer readable storage media of claim 1, wherein the program instructions, when executed by the processor, further direct the computing apparatus to:
capture, based on visual data received from a client device, the viewpoint depicting the two-dimensional digital representation of the real-world environment,
wherein the visual data comprises one or more of a digital image, a video, or a digital representation of an augmented reality application session executing on the client device.

11. The one or more non-transitory computer readable storage media of claim 10, wherein the visual data comprises the digital representation of the augmented reality application session and wherein the program instructions, when executed by the processor, further direct the computing apparatus to:
detect a time instant during the augmented reality application session where the client device satisfies a stillness threshold; and
capture a frame from the digital representation of the augmented reality application session at the time instant.

12. The one or more non-transitory computer readable storage media of claim 10, wherein the visual data comprises the digital representation of the augmented reality application session and wherein the program instructions, when executed by the processor, further direct the computing apparatus to:
generate an augmented reality representation of a product recommendation; and
provide the augmented reality representation of the product recommendation as an overlay within the augmented reality application session.

13. The one or more non-transitory computer readable storage media of claim 1, wherein at least one of the one or more neural networks utilized to detect the real-world objects within the viewpoint comprises a region-based convolutional neural network configured to generate proposed regions of the viewpoint with corresponding probabilities of containing objects.

14. A digital content campaign platform comprising:
a processing system; and
one or more computer readable storage media operatively coupled with the processing system, the one or more computer readable storage media storing;
a three-dimensional (3D) model data store including a plurality of 3D models; and program instructions that, when executed by the processing system, direct the digital content campaign platform to:

analyze, utilizing a region-based convolutional neural network, a viewpoint depicting a two-dimensional digital representation of a real-world environment to identify real-world objects within the viewpoint;

identify, utilizing a part-based alignment algorithm, a three-dimensional (3D) model from the 3D model data store for each of the identified real-world objects in the viewpoint along with a pose and scale of the real-world objects in the viewpoint;

determine, utilizing the identified 3D models, an incompatibility of the real-world objects in the viewpoint based on a style incompatibility of the real-world objects in relation to each other and a color incompatibility of the real-world objects in relation to a background of the viewpoint;

identify, utilizing the identified 3D models, a least compatible object in the viewpoint based on the style incompatibility of the real-world objects in relation to each other and the color incompatibility in relation to a background of the viewpoint; and select at least one product recommendation based on style compatibility of candidate products in relation to the real-world objects and color compatibility of the candidate products in relation to the background of the viewpoint.

15. The digital content campaign platform of claim 14, wherein the program instructions, when executed by the processing system, direct the digital content campaign platform to:

identify, utilizing the part-based alignment algorithm, a pose and scale of the least compatible object in the viewpoint;

generate a two-dimensional representation of the at least one product recommendation with a pose and scale matching the pose and scale of the least compatible object; and modify the viewpoint by replacing the least compatible object in the viewpoint with the two-dimensional representation of the at least one product recommendation.

16. The digital content campaign platform of claim 14, wherein the program instructions, when executed by the processing system, direct the digital content campaign platform to:

generate a targeted communication including the modified viewpoint; and provide the targeted communication to a user associated with the viewpoint via one or more marketing channels.

17. The digital content campaign platform of claim 14, wherein the program instructions, when executed by the processing system, direct the digital content campaign platform to:

capture the viewpoint depicting the two-dimensional digital representation of the real-world environment based on visual data received from a client device associated with a user.

18. A method comprising:

analyzing, utilizing one or more neural networks, a viewpoint depicting a two-dimensional digital representation of a real-world environment to detect real-world objects within the viewpoint;

identifying, utilizing a part-based alignment algorithm, a three-dimensional (3D) model for each of the identified real-world objects in the viewpoint along with pose and scale;

utilizing the identified 3D models, determining an incompatibility of each object of the identified real-world objects in the viewpoint based on a weighted combination of:

a style incompatibility of the object in relation to other of the identified real-world objects in the viewpoint, and a color incompatibility of the object in relation to a background of the viewpoint; and determining a least compatible object in the viewpoint based on the incompatibility of each object of the identified real-world objects in the viewpoint.

19. The method of claim 18, further comprising:

for each object of the identified real-world objects in the viewpoint, computing, using a style compatibility algorithm, the style incompatibility of the object, wherein the style incompatibility comprises a score determined by comparing geometric features of a 3D model corresponding to the object with geometric features of 3D models corresponding to the other of the identified real-world objects in the viewpoint; and for each object of the identified real-world objects in the viewpoint, computing, using a color compatibility algorithm, the color incompatibility of the object, wherein the color incompatibility comprises a score determined by comparing a color of the object to a theme of colors extracted from the background of the viewpoint.

20. The method of claim 18, further comprising:

generating a product recommendation based on a weighted combination of a style compatibility of the product recommendation in relation to a set of surrounding real-world objects in the viewpoint other than the least compatible object and a color compatibility of the at least one product recommendation in relation to the background of the viewpoint.

\* \* \* \* \*